United States Patent [19]

Take et al.

[11] Patent Number: 5,883,887
[45] Date of Patent: Mar. 16, 1999

[54] RADIO DATA TRANSMISSION SYSTEM

[75] Inventors: Keijiro Take; Akira Otsuka, both of Kanagawa, Japan

[73] Assignee: Mitsubishi Denki Kabushiki Kaisha, Tokyo, Japan

[21] Appl. No.: 632,876

[22] Filed: Apr. 16, 1996

[30]  Foreign Application Priority Data

Apr. 18, 1995  [JP]  Japan .................................. 7-092557

[51] Int. Cl.[6] .................................................. H04Q 11/00
[52] U.S. Cl. ........................... 370/329; 370/316; 370/342
[58] Field of Search .................................. 370/312, 313, 370/314, 316, 322, 326, 328, 329, 331, 336, 337, 338, 310, 335, 342, 320, 280, 294

[56]  References Cited

U.S. PATENT DOCUMENTS

| | | | |
|---|---|---|---|
| 5,303,234 | 4/1994 | Kou | 370/85.2 |
| 5,396,539 | 3/1995 | Slekys et al. | 379/59 |
| 5,502,721 | 3/1996 | Pohjakallio | 370/60.1 |
| 5,506,837 | 4/1996 | Sollner et al. | 370/31 |
| 5,513,180 | 4/1996 | Miyake | 370/60.1 |
| 5,590,133 | 12/1996 | Billstrom et al. | 370/349 |
| 5,600,633 | 2/1997 | Jaisingh et al. | 370/277 |
| 5,633,873 | 5/1997 | Kay et al. | 370/336 |
| 5,673,259 | 9/1997 | Quick, Jr. | 370/342 |

FOREIGN PATENT DOCUMENTS

| | | | |
|---|---|---|---|
| 0 399 611 | 11/1990 | European Pat. Off. | H04M 1/72 |
| 0 615 393 A1 | 9/1994 | European Pat. Off. | H04Q 7/04 |
| 0615393 | 9/1994 | European Pat. Off. | H04Q 7/04 |
| 0 642 283 | 3/1995 | European Pat. Off. | H04Q 7/22 |
| 0 642 283 A2 | 3/1995 | European Pat. Off. | H04Q 7/22 |
| 0 699 010 A2 | 2/1996 | European Pat. Off. | H04Q 7/22 |
| 1-274524 | 11/1989 | Japan | H04B 7/26 |
| 5-95358 | 4/1993 | Japan | H04L 12/28 |
| 6-77886 | 3/1994 | Japan | H04B 7/26 |
| WO 93/19544 | 9/1993 | WIPO | H04J 3/24 |
| WO 94/05094 | 3/1994 | WIPO | H04B 7/24 |
| WO 95/16330 | 5/1995 | WIPO | H04Q 7/22 |
| WO95/16330 | 6/1995 | WIPO | H04Q 7/22 |

OTHER PUBLICATIONS

British Search Report for corresponding British application.

Primary Examiner—Dang Ton
Assistant Examiner—Shick Hom
Attorney, Agent, or Firm—Wolf, Greenfield & Sacks, P.C.

[57]  ABSTRACT

A base station and a base station controller are used for providing data communication channels using random access (RACHs) for mobile stations. The base station or the base station controller provides for notifying channel information on an RACH. Each mobile station provide for determining whether or not a packet can be sent and for shifting from one RACH to another based on the channel information. The base station and the base station controller further provide for transferring a packet to a mobile station over the RACH. The base station controller provides for terminal identifier management and packet division and reconstruction for transferring a packet between mobile stations or between a mobile station and the LAN.

17 Claims, 33 Drawing Sheets

RADIO DATA TRANSMISSION SYSTEM

BACKGROUND OF THE INVENTION

1. Field of the Invention

This invention relates to a packet data transmission system in radio communication systems centering on telephones such as a digital cellular system and a digital cordless telephone system.

2. Description of the Related Art

In a conventional radio communication system consisting of a plurality of base stations, a switching system, and a plurality of mobile stations existing in a radio zone formed by the base stations, to transmit and receive telephone and data signals between the base and mobile stations, a TCH is assigned between the mobile and base stations using a CCH, then the TCH is used to execute one-to-one two-way data communication between the mobile and base stations.

For example, as described in Japanese Patent Unexamined No. Hei 6-77886, when receiving a data communication request from a mobile station, the base station and switching system select one or a plurality of TCHs in accordance with the channel use state and if the requested TCH can be selected, assigns the TCH to the mobile station, which then executes data communication on the assigned TCH.

On the other hand, to transmit and receive data between a plurality of mobile stations and a base station, in the radio communication system a common channel is provided for accommodating a plurality of mobile stations and data is transmitted and received by making random access in the common channel in addition to the above-mentioned method of assigning a TCH between mobile and base stations by the line switching for providing a one-to-one two-way data communication line. The random access method is used for a CCH in the line switching.

For example, as described in Japanese Patent Unexamined No. Hei 5-95358, in channel contention control in the random access system, an up link signal from a mobile station to a base station and a down link signal are put into slots on a common channel, the slots of the up and down link signals are synchronized with each other, and transmission disable/enable information for controlling mobile station transmission is suffixed to each of the slots making up the down link signal.

In each base station, the up link channel is monitored in each slot and in the slot detecting an up link signal from a mobile station, the transmission disable/enable information suffixed to the slot of down link signal is changed to transmission disable for disabling other mobile stations from originating calls in the next slot for avoiding signal collision.

When receiving the transmission disable/enable information indicating transmission disable from the base station, the mobile station where up link information to the base station occurs continues to monitor the transmission disable/enable information until the information is changed to transmission enable. When the information is changed to transmission enable, the mobile station judges transmission start or standby in the next slot according to the transmission probability.

In the above-mentioned data communication by the line switching, one mobile station occupies one TCH and high-speed data communication can be conducted, but a connection delay occurs because of the TCH assignment process. In the data communication by the random access system, the connection delay is small, but if a plurality of mobile stations access one TCH, high traffic is handled and the throughput lowers. To use a plurality of TCHS, management among the TCHs is required.

In the invention, radio physical channels for transmitting and receiving user information are called communication channels (TCHS) and those for transmitting and receiving control information used for radio channel establishment and call connection are called control channels (CCHs). However, to use all or some of TCHs to transmit and receive the control information, all or some of the TCHs are logically called TCH attendant control channels (ACHs). Further, when a TCH is used to transmit and receive a telephone signal, it is logically called a voice channel (VCH) and when a TCH is used for data communication using random access, it is called a random access channel (RACH).

That is, the VCH and RACH represent different channels in function, but are TCHs as radio physical channels.

SUMMARY OF THE INVENTION

It is an object of the invention to solve a problem of a large connection delay caused by the necessity for assigning a new TCH whenever data occurs because the TCH is selected from among TCHs for assignment when a new telephone call occurs regardless of telephone or data calls in a conventional communication system by line switching.

It is another object of the invention to solve a problem of complicating TCH management when a plurality of TCHs are operated as RACH in a conventional random access data communication system.

It is another object of the invention to solve a problem of an increase in the packet transmission wait time of a standby mobile station in the conventional data communication system by line switching because when one mobile station is communicating on a TCH, another mobile station stands by on the TCH until the communication of that mobile station ends.

It is another object of the invention to solve a problem of incapability of changing the line transmission speed in response to data communication line traffic because the data communication line transmission speed is constant in the conventional system.

According to a first aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs with voice two-way communication as one unit and down link channels of the TCHs include an attendant CCH wherein each of the base stations uses a plurality of TCHs as RACHS, characterized by means f or controlling all TCHs unused for telephone calls as RACHs.

According to a second aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that each base station comprises means for notifying TCHs that can be used as RACHs among the TCHs over the CCH, means for periodically notifying the channel state on a down line of the RACH, and means for notifying another RACH to which a shift can be made if the channel state changes.

According to a third aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that a mobile station in a packet sending standby state shifts to another RACH specified with reception of a packet transmission disable information message and a shift destination RACH sequence notification from the corresponding base station as a trigger.

According to a fourth aspect of the invention, there is provided a radio data transmission system comprising a plurality of base stations, a plurality of mobile stations, and base station controller and having a channel configuration wherein radio channels between each base station and a plurality of mobile stations consist of a CCH and a plurality of TCHs wherein each of the base stations uses a plurality of TCHs as RACHS, characterized in that each of the mobile stations comprises means for calculating shifting probability, means for continuing the RACH shifting based on the calculated probability, and means for postponing the channel shifting based on the shifting probability at the RACH shifting time of the mobile station.

According to a fifth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized by means, when a new telephone call occurs, for selecting a TCH used for the telephone call from among the TCHs operated by the base station accommodating the telephone call by the base station controller, means for deleting the TCH from a shift RACH sequence and changing the shift RACH sequence, means for notifying the changed RACH sequence on all RACHs in the base station, and means for changing a conversion table contained in the base station controller.

According to a sixth aspect of the invention, there is provided a radio data transmission system comprising plurality of base stations, a plurality of mobile stations, and a base station controller and having a channel configuration wherein radio channels between each base station and plurality of mobile stations consist of a CCH and a plurality of TCHs wherein each of the base stations uses a plurality of TCHs as RACHS, characterized by means for managing so as to cyclically specify an RACH to which a shift can be made for each group of RACHs operated in a single base station by the base station and the base station controller.

According to a seventh aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHSs, characterized by means for calculating shift probability P at a stage where a mobile station, which has a send packet and cannot send segments on its acquired RACH, has shifted one RACH to another in sequence according to a shift channel sequence notified from the corresponding base station, means for comparing the probability P with a threshold value previously stored in the mobile station, means for continuing the channel shift based on the comparison result, and means for postponing the shift for postponement time T previously stored in the base station.

According to an eighth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHs, characterized by means for storing the number of times an RACH sequence has been cycled at a stage where a mobile station has shifted from one RACH to another in sequence in all the RACH sequence managed by a base station based on shift channel information notified from the base station, means for calculating cyclic probability in response to the number of times, means for comparing the calculated probability with a threshold value previously stored in the mobile station and judging continuation or postponement of the shift, and means for postponing the channel shift for a predetermined time if postponement is judged.

According to a ninth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHs, characterized in that each base station comprises means for managing a plurality of RACHs and that the base station controller comprises means, upon reception of a new RACH use request from one of the mobile stations, for assigning different RACHs in sequence to the mobile station.

According to a tenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHs when a time division multiple access (TDMA) system is used as a radio access system, characterized in that each of the mobile stations comprises means for generating a segment with a synchronization bit and the mobile station number of the mobile station and sending the segment to an RACH aquired by the mobile station, that each of the base stations comprises means, upon normal reception of the segment, for notifying the mobile station of the use right of the RACH on the down channel of the RACH and providing information indicating that other mobile stations acquiring the RACH are disabled from transmitting a packet, and means for establishing up synchronization by using the segment, that each of the mobile stations comprises means for adding numbers for identifying the segments, and that the base station controller or each of the base stations comprises means for releasing the use right upon reception of the last segment according to the segment identification numbers.

According to an eleventh aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHs, characterized in that the base station controller comprises a conversion table for representing correspondence among mobile station numbers identifying the mobile stations, addresses identifying the mobile stations in a LAN, and channel numbers CNs identifying RACHs, means for searching the conversion table and changing data described in the table upon reception of an RACH use request from one of the mobile stations or a new segment, and means for rewriting the conversion table if data does not exist.

According to a twelfth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that the base station controller comprises means, upon reception of a packet from a LAN, for searching a conversion table for the RACH number of the RACH acquired by the mobile station for which the packet is destined and sending a packet incoming notification to the base station managing the RACH, that the base station comprises means for passing on the packet incoming notification on all RACHs managed by the base station when receiving the packet incoming notification, that the mobile station comprises means, if the mobile station is shifting from one RACH to another, for stopping the channel shifting and returning to the channel shifting start RACH upon reception of the call incoming notification, and that the base station controller comprises means for transmitting the packet on the RACH corresponding to the mobile station number of the mobile station stored in the conversion table after sending the packet incoming notification.

According to a thirteenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that each of the base stations and the base station controller have means for handling all or some of TCHs previously specified in a radio zone as one integrated RACH and controlling.

According to a fourteenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that each of the base stations and the base station controller comprise means for handling any desired TCHs as one integrated RACH and controlling, means for dividing a part or all of the integrated RACH into a plurality of RACHs for operation, and means for managing a plurality of RACHs different in speed.

According to a fifteenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized by means for assembling segments received on different RACHs into a packet.

According to a sixteenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized by means, if the base station controller does not receive a packet within a predetermined time on an RACH from the mobile station having the use right of the RACH, for releasing the use right of the RACH, means for holding for a predetermined time, segments received from the mobile station by the time the RACH is released, means for storing segments that cannot be transmitted on the RACH by the mobile station, and means, when the mobile station again sends the remaining segments, for assembling the held segments and newly received segments into a packet.

According to a seventeenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized in that when a plurality of RACHs are operated in a radio zone, each of the base stations or the base station controller comprises means for providing TCHs inhibited from being assigned to telephone calls and means for determining the number of channels inhibited from being assigned to telephone calls in response to the number of mobile stations issuing an RACH use request.

According to an eighteenth aspect of the invention, there is provided a radio data transmission system comprising a plurality of base stations, a plurality of mobile stations, and a base station controller and having a channel configuration wherein radio channels between each base station and a plurality of mobile stations consist of a CCH and a plurality of TCHs wherein each of the base stations uses a plurality of TCHs as RACHS, characterized by means for measuring channel use efficiency of each RACH managed by one base station, means for selecting an RACH having low channel use efficiency based on the measured channel use efficiency of each RACH, and means for deleting the selected RACH from the RACH group.

In the radio packet data communication system, the base station and the base station controller control all radio and wire lines unassigned to telephone calls as RACHs and when a telephone call occurs, select a channel from among the channels used as the RACHs and assign it to the telephone call.

In the radio packet data communication system, the base station or the base station controller notifies on the down channel of the line used as an RACH, channel information concerning the RACH and information concerning other RACHs periodically or at the state transition time, and each mobile station judges packet transmission, channel shift, and detachment from RACH based on the information.

In the radio packet data communication system, the base station or the base station controller notifies information containing another RACH sequence to which a shift can be made periodically or at the state transition time on the down link of RACH, and each mobile station transmitting no packet starts a channel shift process upon reception of the information.

In the radio packet data communication system, whether channel shift is continued or postponed is determined based on the shift probability calculated in the channel shift probability calculation section of the mobile station starting the channel shift process.

In the radio packet data communication system, when a new telephone call occurs, the CN of the RACH using the TCH assigned to the telephone call is deleted from the shift channel sequence, operation of the TCH as RACH is stopped, and information is sent to the mobile station acquiring the RACH for prompting the mobile station to shift from the RACH to another according to the shift channel sequence. The base station controller changes registration of the mobile station registered as acquisition of the RACH.

In the radio packet data communication system, the base station or the base station controller specifies so as to cyclically shift the shift channel sequence notified on the down line of each RACH managed by the base station.

In the radio packet data communication system, when a mobile station waiting for sending a packet has shifted from one RACH to another once completely according to the shift channel sequence, the probability calculated in the cyclic probability calculation section in the mobile station is compared with the threshold value previously stored in the mobile station, thereby determining whether or not the channel shift is to be continued or stopped.

In the radio packet data communication system, the cyclic probability calculation section has a cyclic probability calculation algorithm for changing the calculated probability in response to the number of times the shift channel sequence has been cycled, and the mobile station determines whether or not the channel shift is to be continued or stopped based on the probability calculated by the algorithm when the mobile station has once cycled the shift channel sequence.

In the radio packet data communication system, if the base station controller accepts an RACH use request from a mobile station and a plurality of RACHs are operated in the radio zone where the mobile station exists, an RACH different from the RACHs assigned to different mobile stations previously existing in the radio zone is assigned to that mobile station.

In the radio packet data communication system, when a mobile station waiting for sending a packet recognizes that an up link is unassigned according to the channel information from the base station or the base station controller on the down link of the RACH acquired by the mobile station, it sends the first segment containing a synchronization bit on the up link of the RACH. If the segment is normally received and up synchronization is set, the mobile station can acquire the RACH and then sends segments consecutively on the RACH. The base station controller assembles the segments sent from the mobile station into a packet and sends the packet to the LAN.

In the radio packet data communication system, the base station controller uses a conversion table to manage the correspondence among the terminal identifiers of the mobile stations acquiring RACHs, the identifiers of the RACHS, and the identifiers of the mobile stations on the LAN, and changes the conversion table according to the route of the packet received when each mobile station makes an RACH use request or makes a channel shift.

In the radio packet data communication system, the base station controller searches the conversion table based on the destination of a packet received from the LAN or a mobile station. If a mobile station corresponding to the destination exists, the base station controller sends a packet reception notification to all RACHs controlled by the base station managing the RACH acquired by the mobile station, then transfers the packet to the RACH corresponding to the mobile station stored in the conversion table. If the mobile station receives the packet reception notification while shifting from one channel to another, it returns to the shift source RACH and receives the transferred packet.

In the radio packet data communication system, the base station controller and the base station combine predetermined TCHs to form a high-speed RACH and control the RACH in the same base station.

In the radio packet data communication system, the base station controller and the base station manage and control a plurality of integrated RACHs different in speed and divide and integrate the RACHs and control them.

In the radio packet data communication system, the base station controller reconstructs a data packet from segments transferred consecutively from different TCHs making up an integrated RACH, disassembles a call incoming data packet to a mobile station acquiring the integrated RACH into segments, and distributes them to the CCHs making up the integrated RACH for transfer.

In the radio packet data communication system, if the base station controller does not receive a new segment for a predetermined time before receiving a segment to which an end flag is added, it places the RACH in the unassigned state and releases the use right of the RACH. The base station controller holds segments received from the mobile station for a predetermined time.

In the radio packet data communication system, the base station controller does not assign a telephone call to at least one of all TCHs in each radio zone.

In the radio packet data communication system, an RACH having lower channel use efficiency than other RACHs managed by one base station has a high possibility of interfering with RACH of another base station, and use of that RACH as RACH is stopped.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Referring now to the accompanying drawings, there are shown preferred embodiments of the invention.

Embodiment 1

Figure 1:
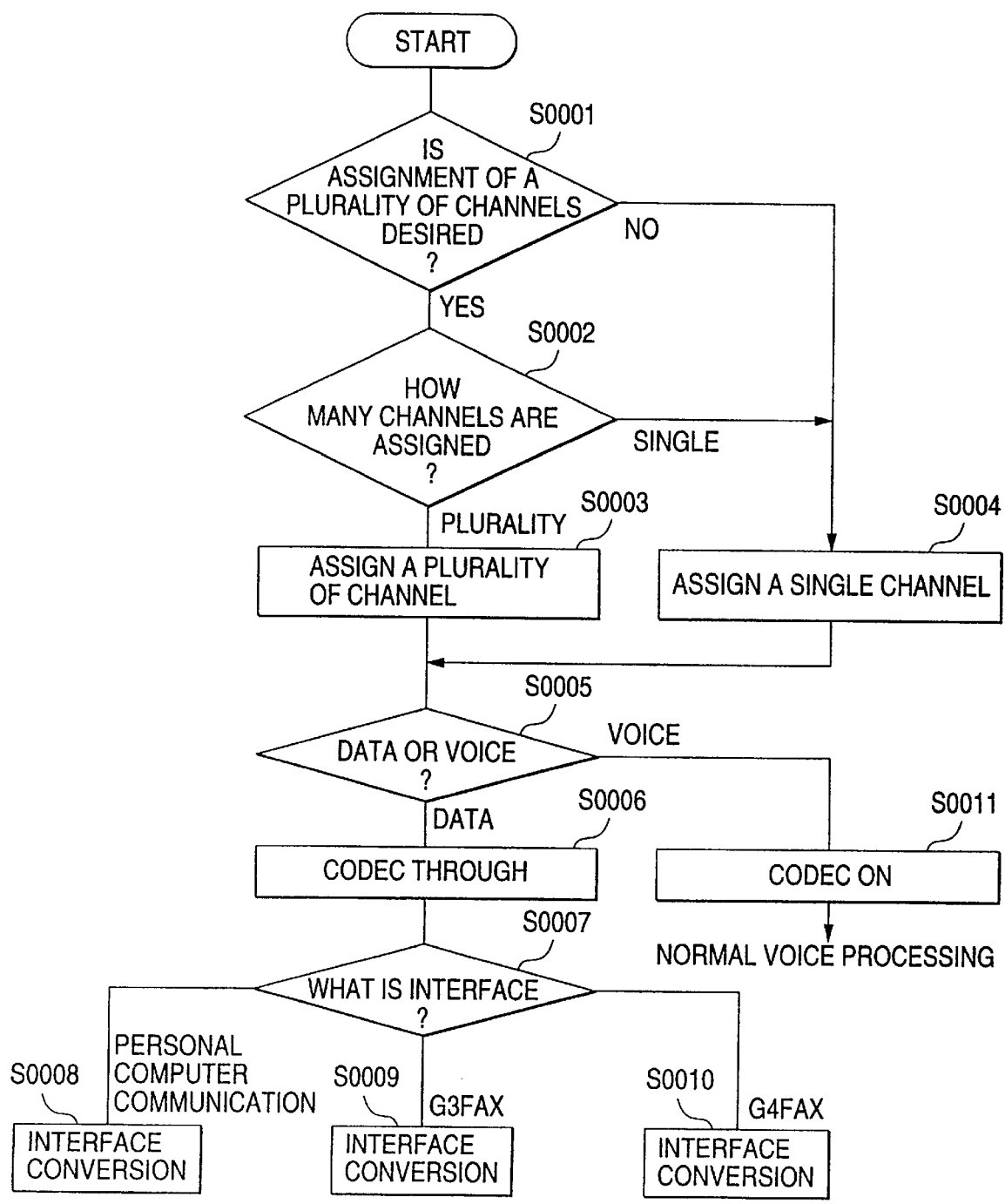
FIG. 1 is a flowchart of TCH assignment in a conventional example.
Figure 2:
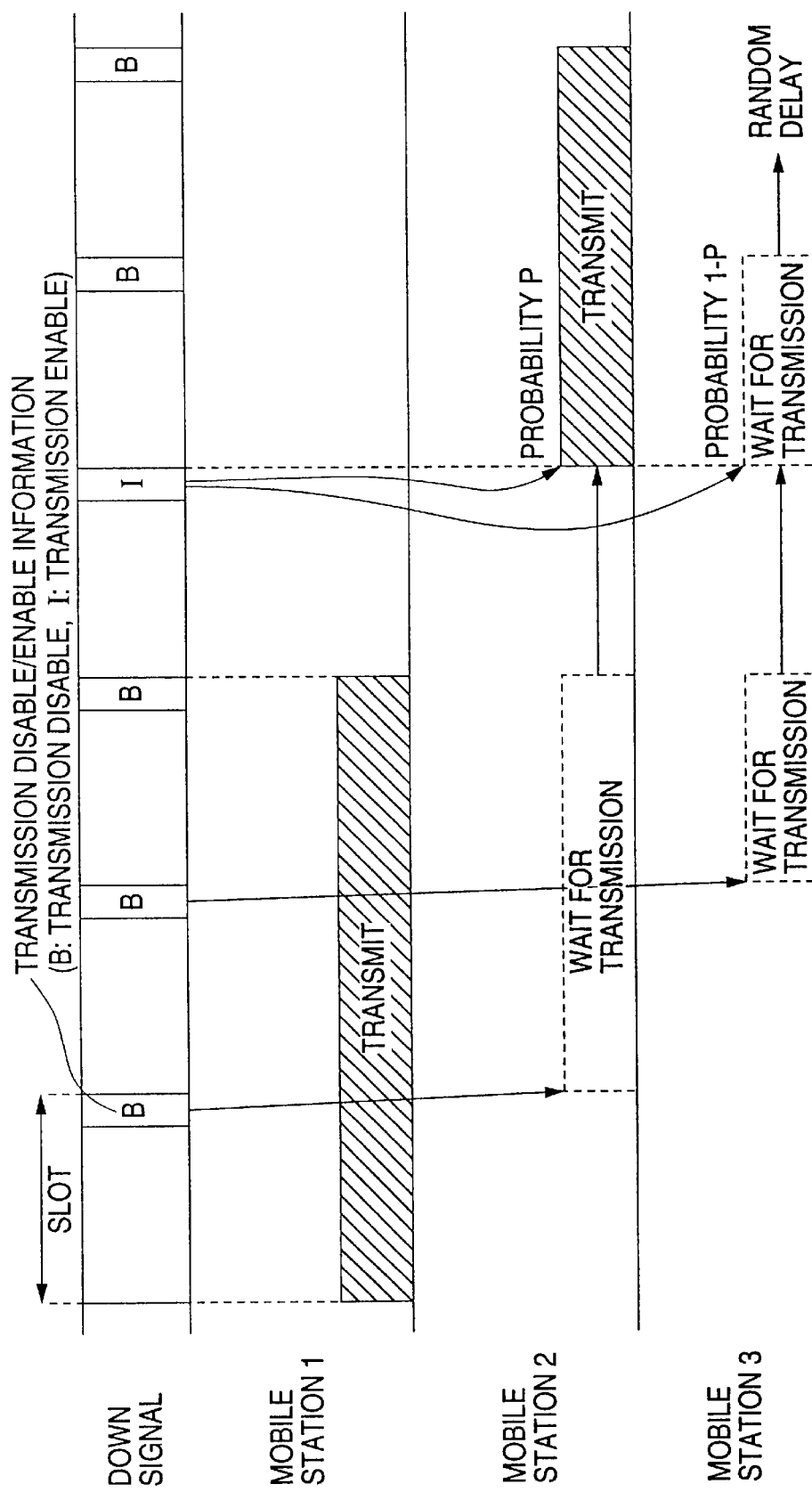
FIG. 2 is a schematic diagram of RACH contention control in a conventional example.
Figure 3:
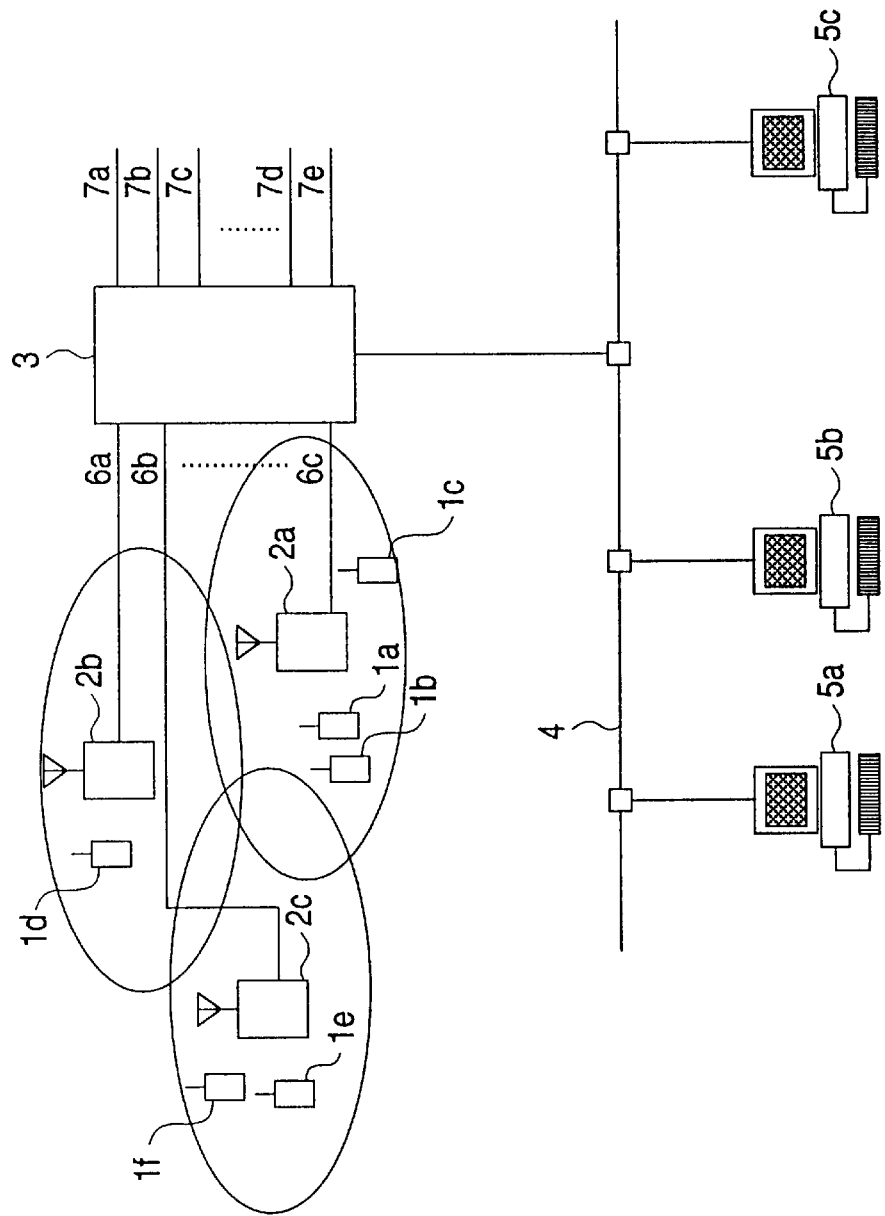
FIG. 3 is a schematic drawing of a radio communication system in the invention.

FIG. 3 is an illustration showing one embodiment of a radio communication system for executing communication between base stations and mobile stations in the invention.

Figure 4:
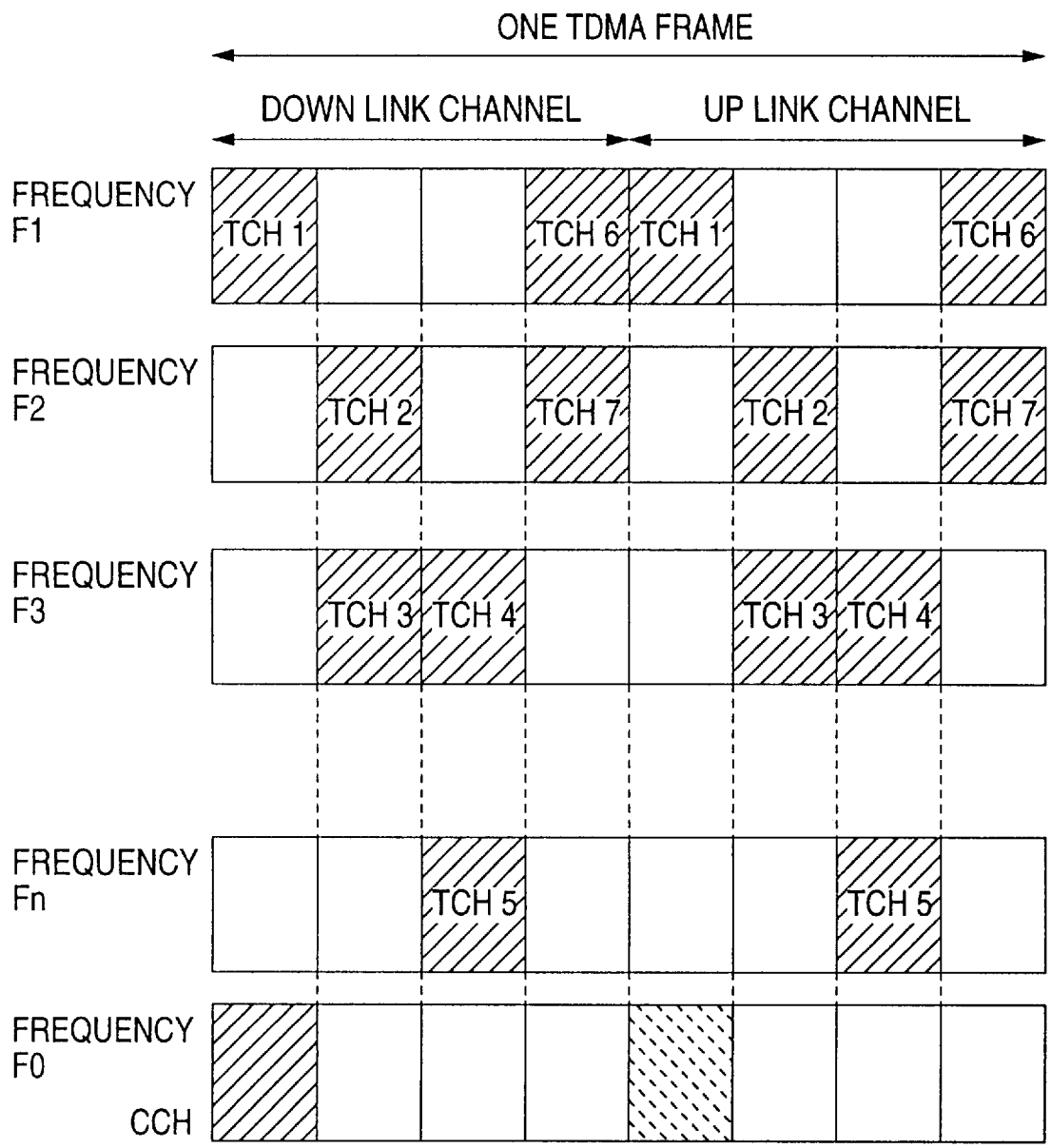
FIG. 4 is a carrier configuration diagram to use a TDMA system for a radio line between base and mobile stations.
Figure 5:
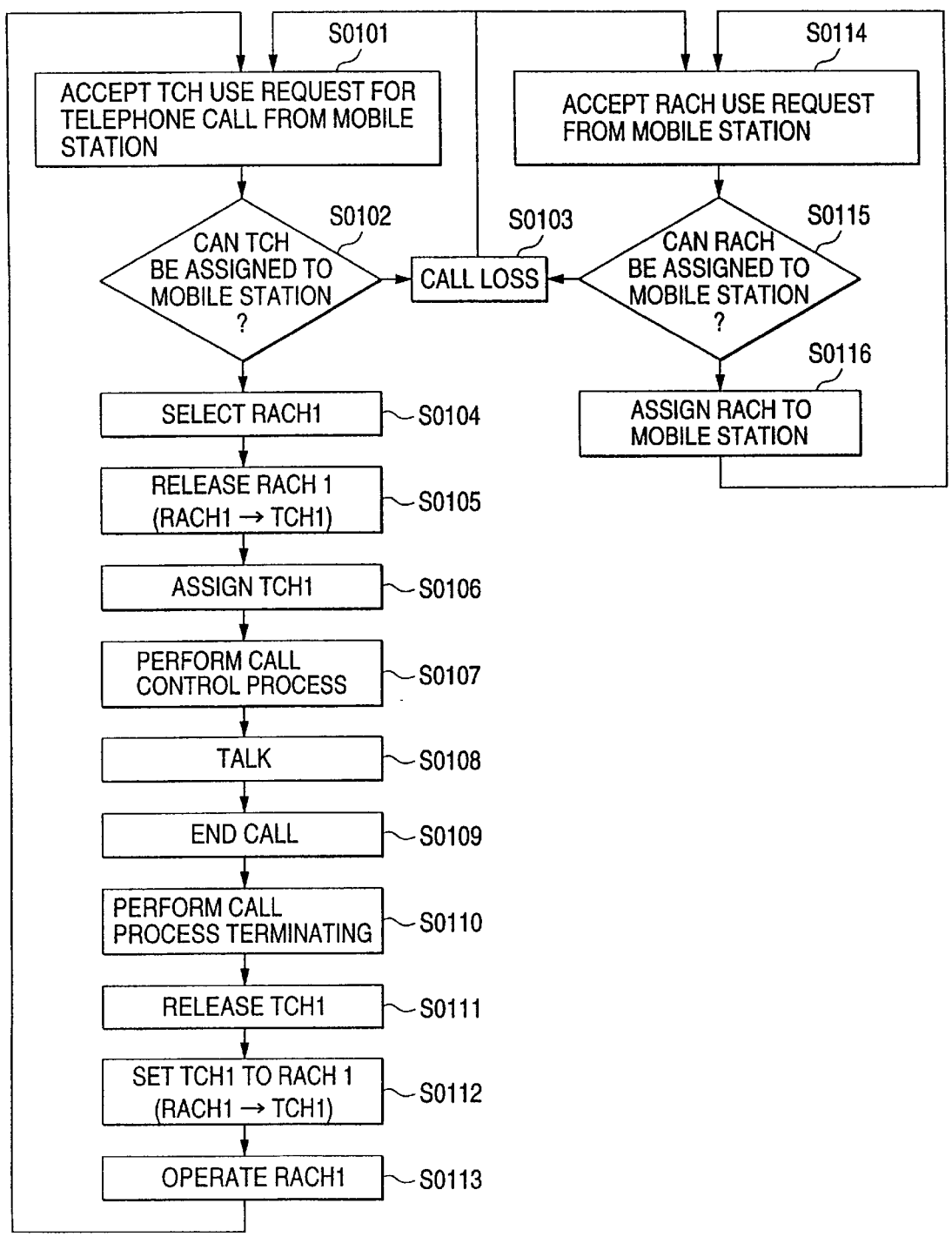
FIG. 5 is a flowchart showing one embodiment of call setting.

FIG. 4 is a diagram showing one embodiment showing the carrier configuration to use a TDMA (time division multiple access) system for a radio line between base and mobile stations in the invention. FIG. 5 is a flowchart showing one embodiment of call setting in the invention.

A base station controller is connected to base stations, each of which forms a radio zone for providing TCHs for mobile stations. The base stations and the base station controller always control TCHs unused for telephone calls as RACHs. From a mobile station, an RACH use request is transmitted to the base station over a control channel on the radio channel. The base station transfers the RACH use request to the base station controller. Upon reception of the RACH use request at step S0114, the base station controller determines whether or not RACHs controlled by the base station exist at step S0115. If they exist, the base station controller selects one of the RACHs and assigns it to the mobile station at step S0116. If no RACHs are controlled by the base station, a call loss results.

If a mobile station transmits a TCH use request for a telephone call, the TCH use request is transmitted to the base station over a control channel on the radio channel. The base station transfers the TCH use request to the base station controller. Upon reception of the TCH use request at step S0101, the base station controller determines whether or not TCHs unused for a telephone call exist in the TCHs managed by the base station at step S0102. If there are TCHs that can be assigned to the mobile station, the TCHs are operated as RACHS. Then, the controller selects one of the RACHs at step A0104, releases the RACH at step A0105, and assigns it to the mobile station at step S0106. A call connection process for line switching of the TCH assigned from the base station controller is executed for line setting at step S0107 and talking is started at step S0108. When the talking ends at step S0109, the base station controller performs a call end process on the wire side at step S0110, releases the radio TCH at step S0111, sets the TCH to an RACH at step S0112, and starts control of the TCH as an RACH at step S0113.

However, in the steps executed by the base station controller, TCH selection, assignment, and release (steps S0101, S0102, S0104, S0105, S0106, S0112, and a part of S0113) may be performed in the base station.

In this method, all TCHs managed in the base stations or the base station controller can be used as RACHs at the normal time and only when a telephone call occurs, one of the TCHs used as the RACHs can be used as a VCH, so that the channel use efficiency can be increased.

Embodiment 2

Figure 6:
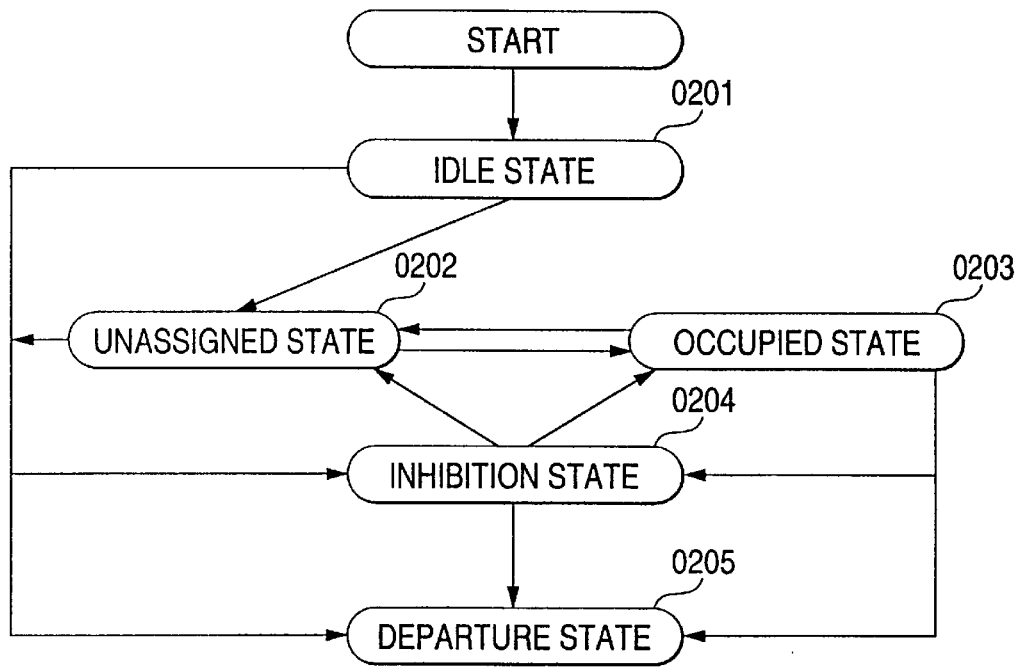
FIG. 6 is a diagram showing one embodiment of the RACH state transition.
Figure 7:
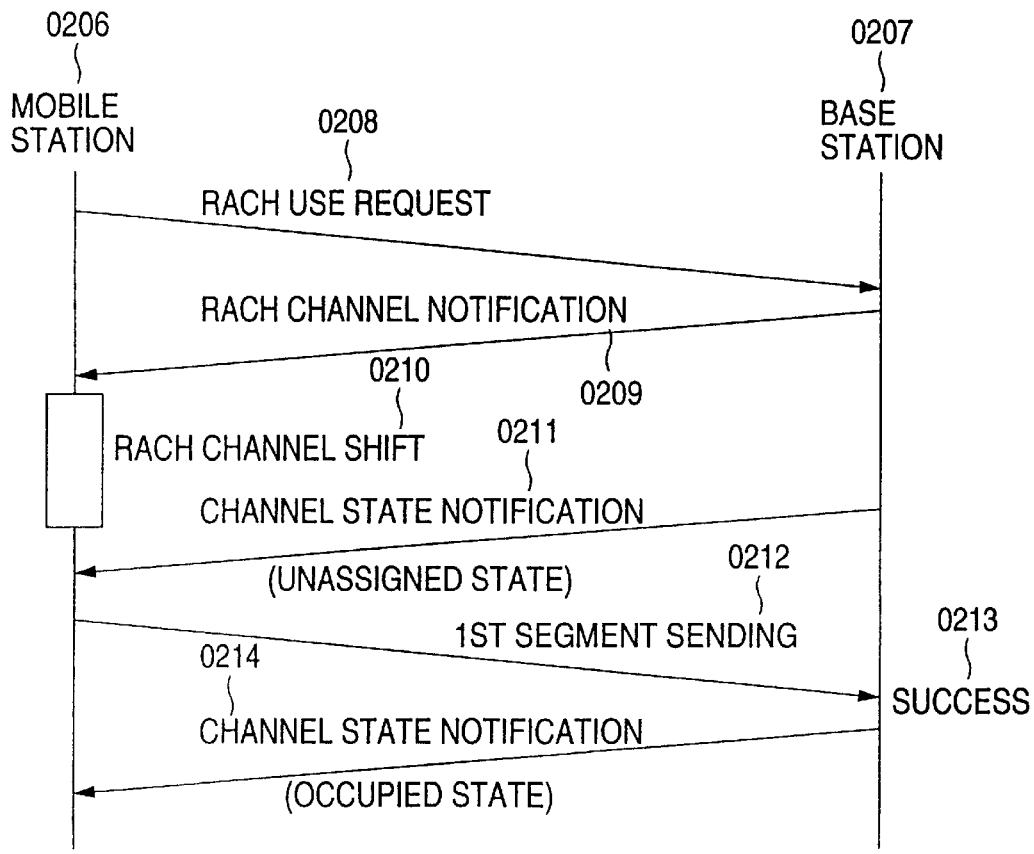
FIG. 7 is a sequence chart showing one embodiment of access right acquisition on an RACH between mobile and base stations.

FIG. 6 is a diagram showing one embodiment of the RACH state transition in the invention. FIG. 7 is a sequence chart showing one embodiment of access right acquisition on an RACH between mobile and base stations.

A mobile station sends an RACH use request on an up CCH at 0201. When receiving the RACH use request, the base station selects one of RACHs and notifies the mobile station of the number of the selected RACH at 0202. The mobile station shifts to the RACH selected by the base station and receives channel information sent from the base station on the RACH at 0203. The channel information represents the channel state of the RACH by a message. The channel state is an unassigned, occupied, departure, inhibition, or idle state. When an RACH is in the unassigned state, mobile stations sending a segment on the RACH do not exist and every mobile station acquiring the RACH can send a packet. The occupied state is a state in which a mobile station is sending a packet on the RACH and other mobile stations than the mobile station are inhibited from transmitting a packet. The departure state is a state in which all mobile stations acquiring the RACH for use for a telephone call are prompted to make a channel shift. The inhibition state is a state in which all mobile stations acquiring the RACH are inhibited from emitting a radio wave. The idle state is a state in which the RACH is being set.

When determining that the channel state is an unassigned state from the received channel information, the mobile station sends a segment consisting of synchronization bits and the identification code of the mobile station to the base station on the TCH if the radio access system is TDMA. The base station receives the segment normally, sets the channel state to the occupied state, and notifies the mobile station of channel information with the identification code of the mobile station on the down link channel, thereby granting permission of access to the TCH to the mobile station.

According to the method, if another mobile station uses the RACH specified by the base station, one mobile station having a transmission packet can omit the process of shifting to CCH and receiving assignment of another RACH from the base station and can autonomously shift from one RACH to another and detect an unassigned RACH for sending a packet.

Embodiment 3

Figure 8:
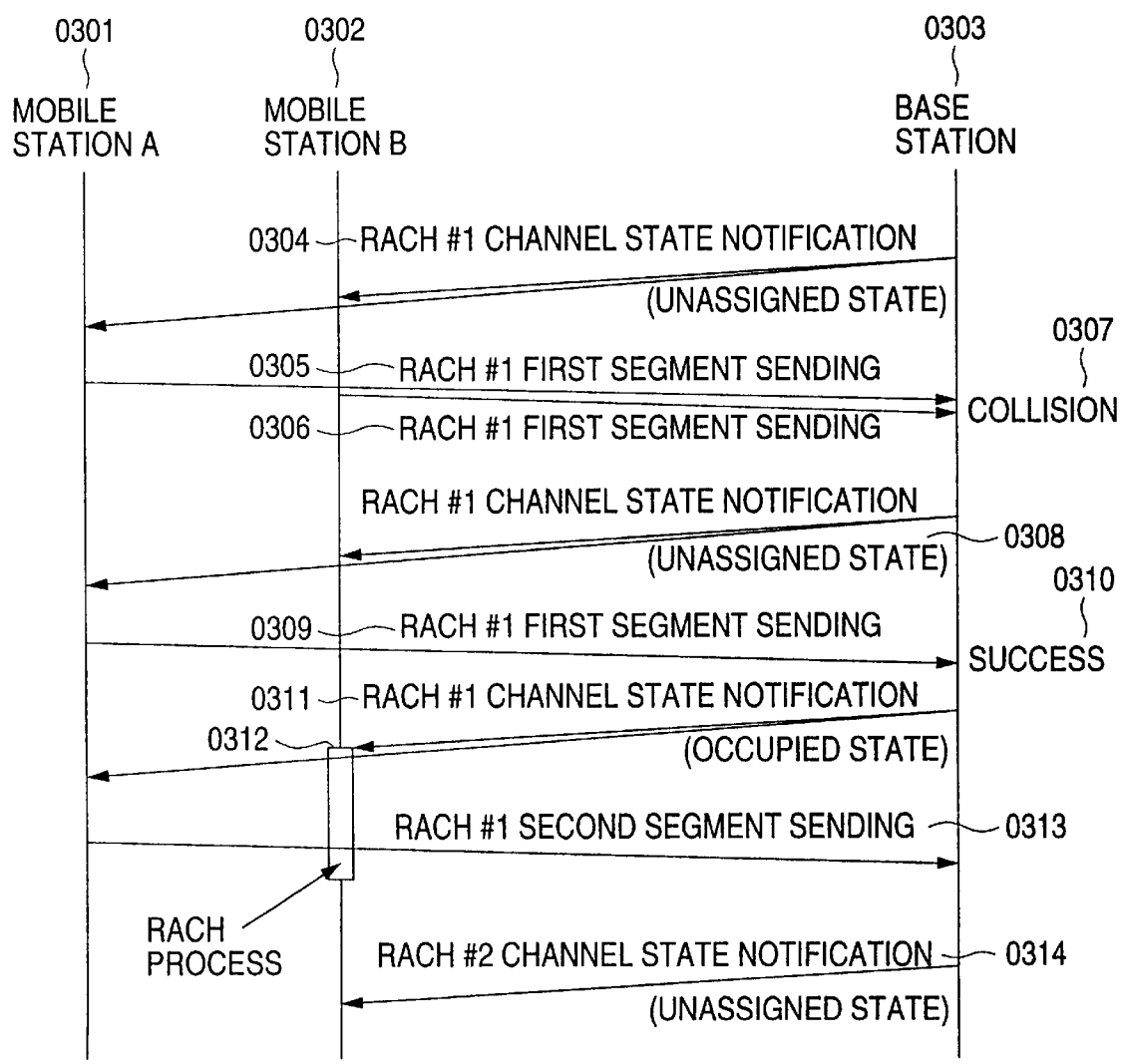
FIG. 8 is a sequence chart showing the channel shift timing of mobile stations.
Figure 9:
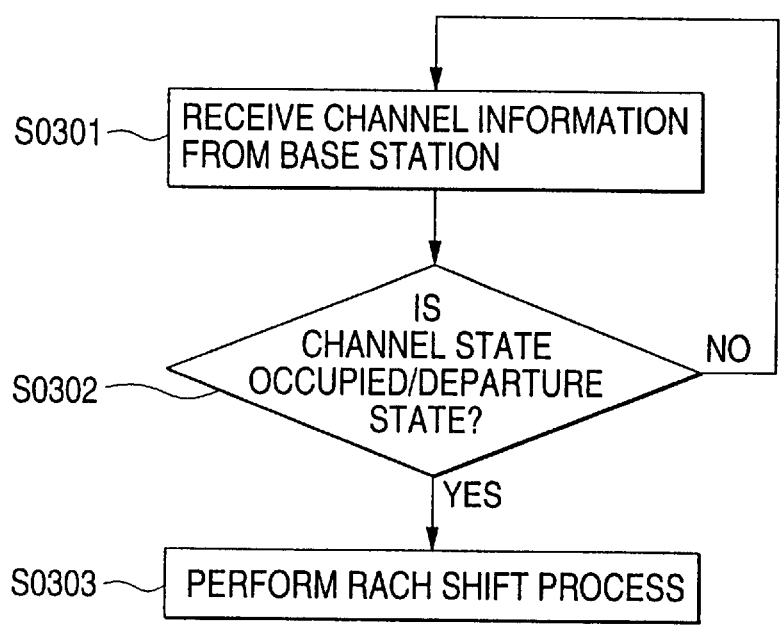
FIG. 9 is a flowchart showing the channel shift of mobile stations.

FIG. 8 is a chart showing one embodiment of the channel shift timing of mobile stations in the invention. FIG. 9 is a flowchart showing one embodiment of the channel transition of mobile stations in the invention.

On each RACH controlled by a base station, a message indicating the channel state of the RACH is sent. The mobile station acquiring the RACH receives the message at step S0301 and determines whether or not sending a segment is enabled in response to the channel state. When the channel state is an unassigned state, the mobile station having send data sends the first segment. When receiving the segment normally, the base station sets the channel state to an occupied state and sends a message with a code representing the occupied state, the number of the mobile station sending the normally received segment, and a shift RACH sequence as a channel state notification message. If the mobile station receiving the message is the segment sending mobile station, the mobile station can acquire the access right to the RACH. Of the mobile stations other than that mobile station, a mobile station having send data shifts from one RACH to another based on the shift RACH sequence contained in the message at step S0303 with reception of the message as a trigger at step S0302.

According to the method, while the state of the acquired RACH does not change, the mobile station can know the state of the RACH periodically, and at the RACH state change timing, can know the next transition state of the RACH; if a shift is made from another RACH, the shift destination RACH can also be known from a shift destination RACH notification given periodically, or if another mobile station acquires the use right, immediately the shift destination RACH can be known. Therefore, the mobile station having a transmission packet can immediately enter the RACH shift process in response to the RACH state.

Embodiment 4

Figure 10:
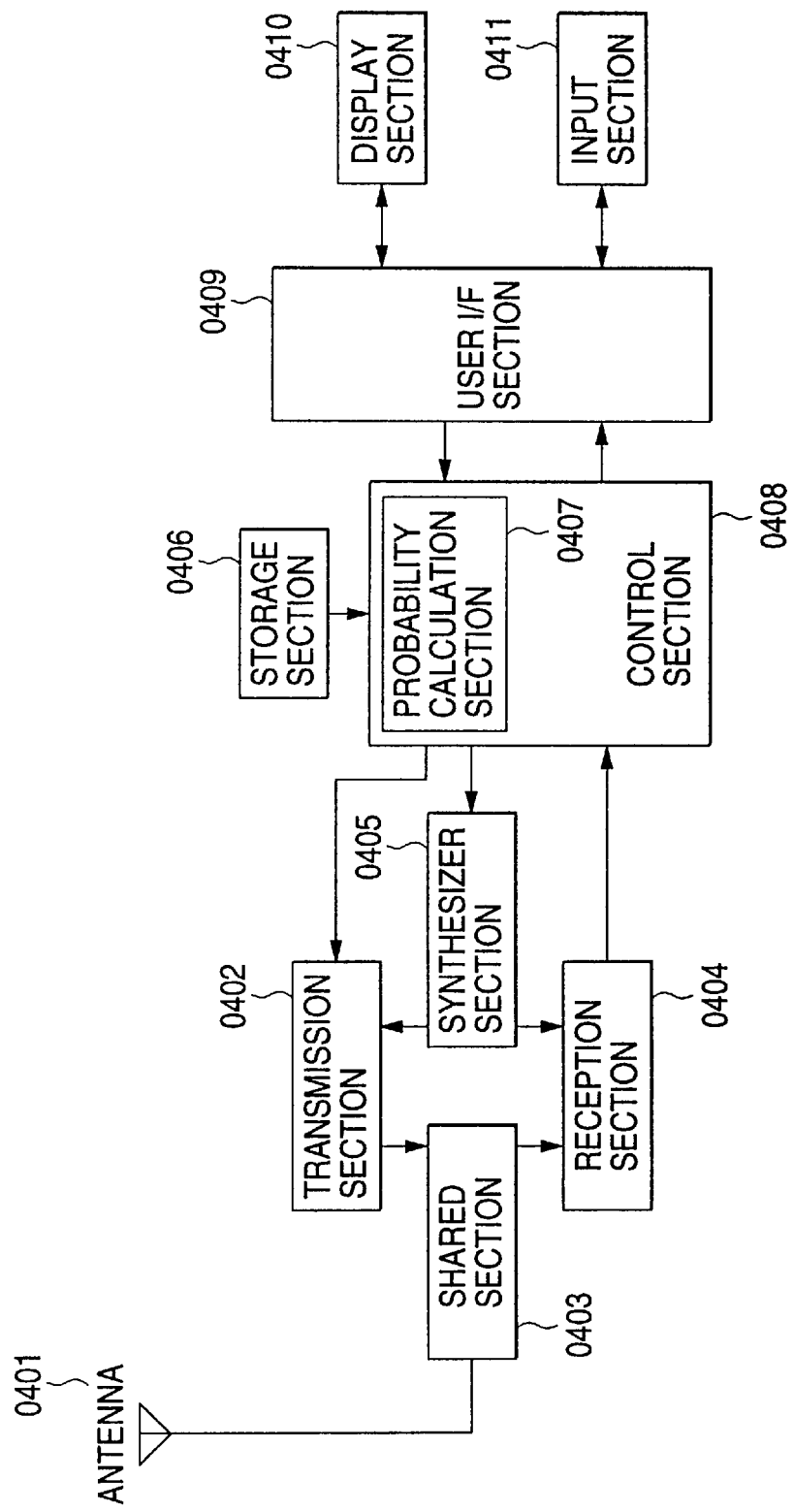
FIG. 10 is a block diagram showing one embodiment of the configuration of a mobile station.
Figure 11:
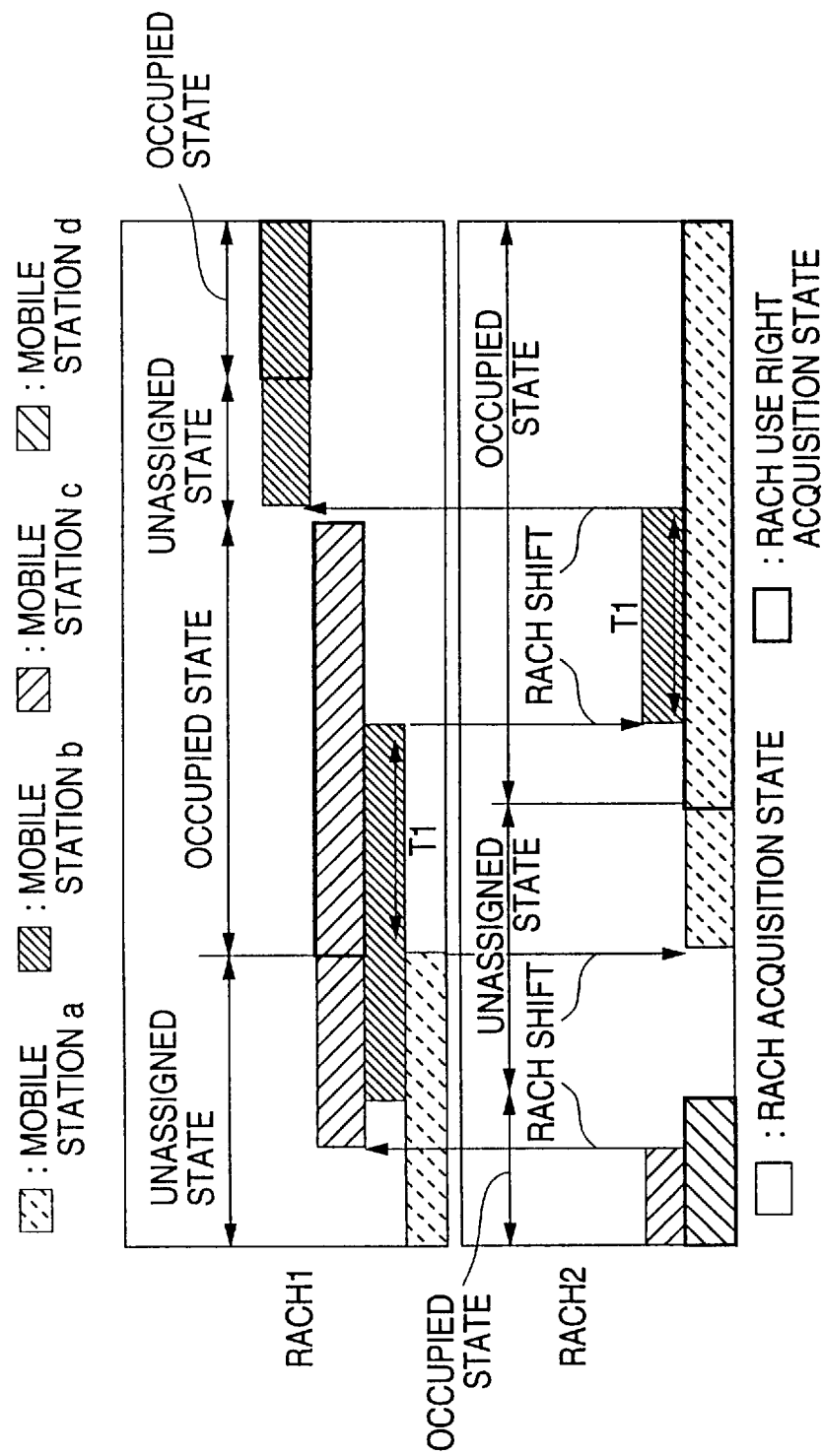
FIG. 11 is a diagram showing one embodiment of a channel shift in the invention.
Figure 12:
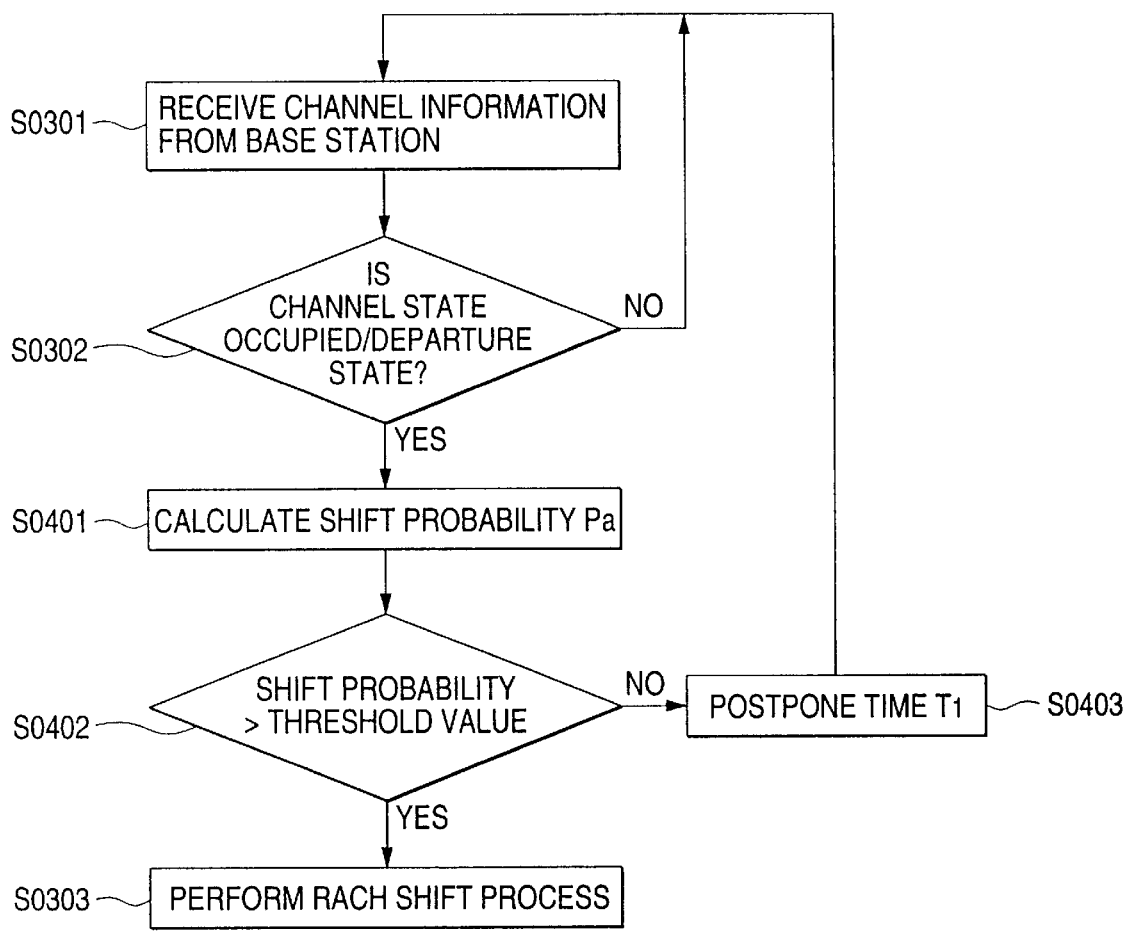
FIG. 12 is a flowchart of calculating the channel shift probability in the mobile station.

FIG. 10 is a block diagram showing one embodiment of the configuration of a mobile station in the invention. FIG. 11 is a diagram showing one embodiment of a channel shift in the invention. FIG. 12 is a flowchart showing one embodiment of calculating the channel shift probability in the mobile station in the invention.

When a mobile station having send data detects the state of the acquired RACH being the occupied state based on the channel information from a base station, it calculates the shift probability Pa by a probability calculation section of the mobile station at step S0401 and compares the probability Pa with a threshold value stored in a storage section of the mobile station at step S0402. If Pa is greater than the threshold value, the mobile station enters an RACH shift process. If Pa is less than the threshold value, the mobile station waits for postponement time T1 stored in the storage section, then again receives notification information provided from the base station and checks the channel information contained in the information.

According to the method, the mobile station starts the channel shift process at the channel shift timing according to the probability calculated for each mobile station and the channel shift timings of mobile stations change, thus not all mobile stations enter the RACH shift process at the timing of receiving a packet transmission disable notification or shift destination RACH notification, and the mobile stations contending with each other at the same timing of the same RACH can be reduced, enhancing the channel use efficiency.

Embodiment 5

Figure 13:
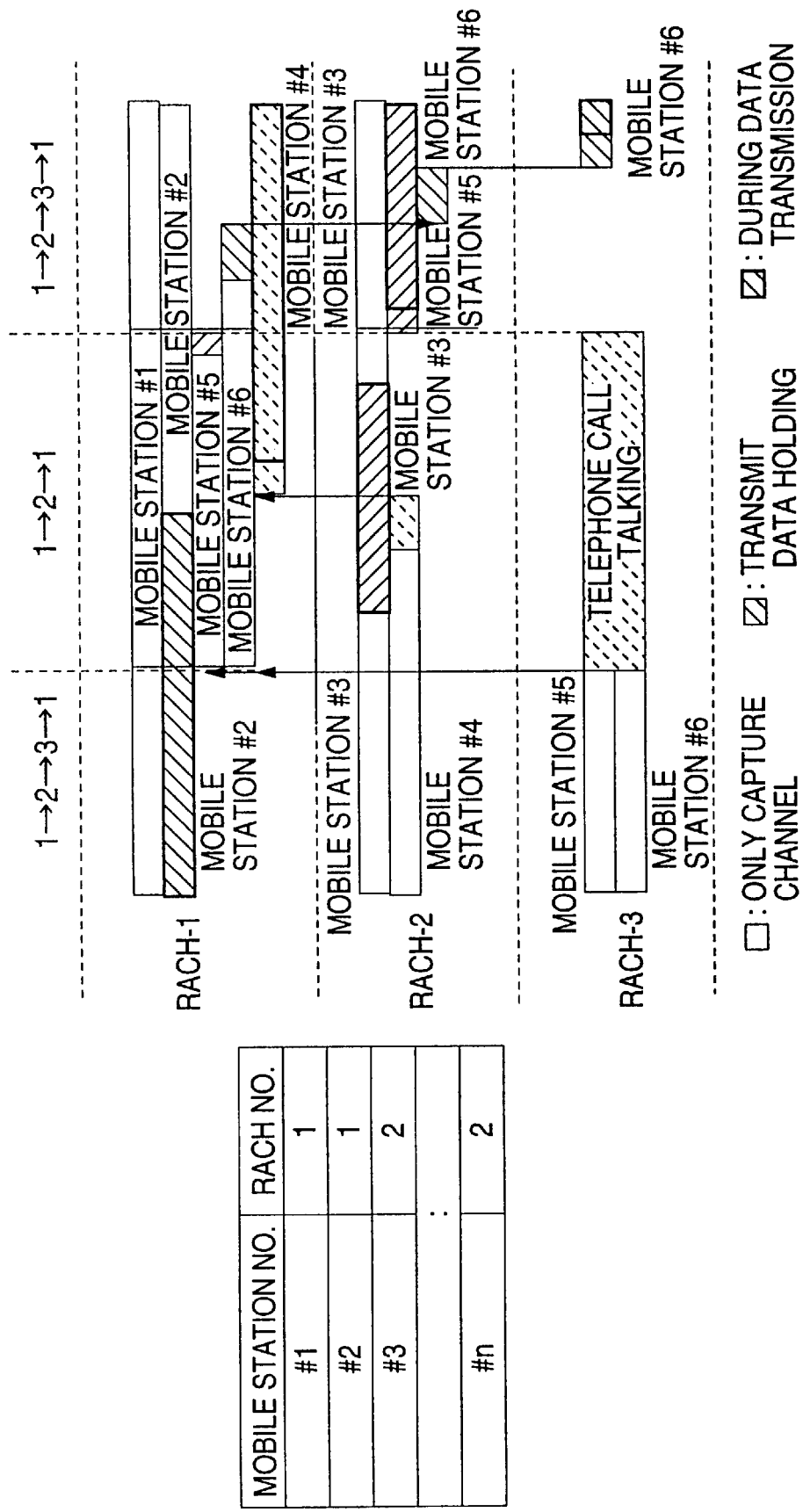
FIG. 13 is a table showing one example representing the correspondence between RACH and mobile station numbers registered in a base station controller in the invention and a diagram showing one embodiment of the RACH transition state.
Figure 14:
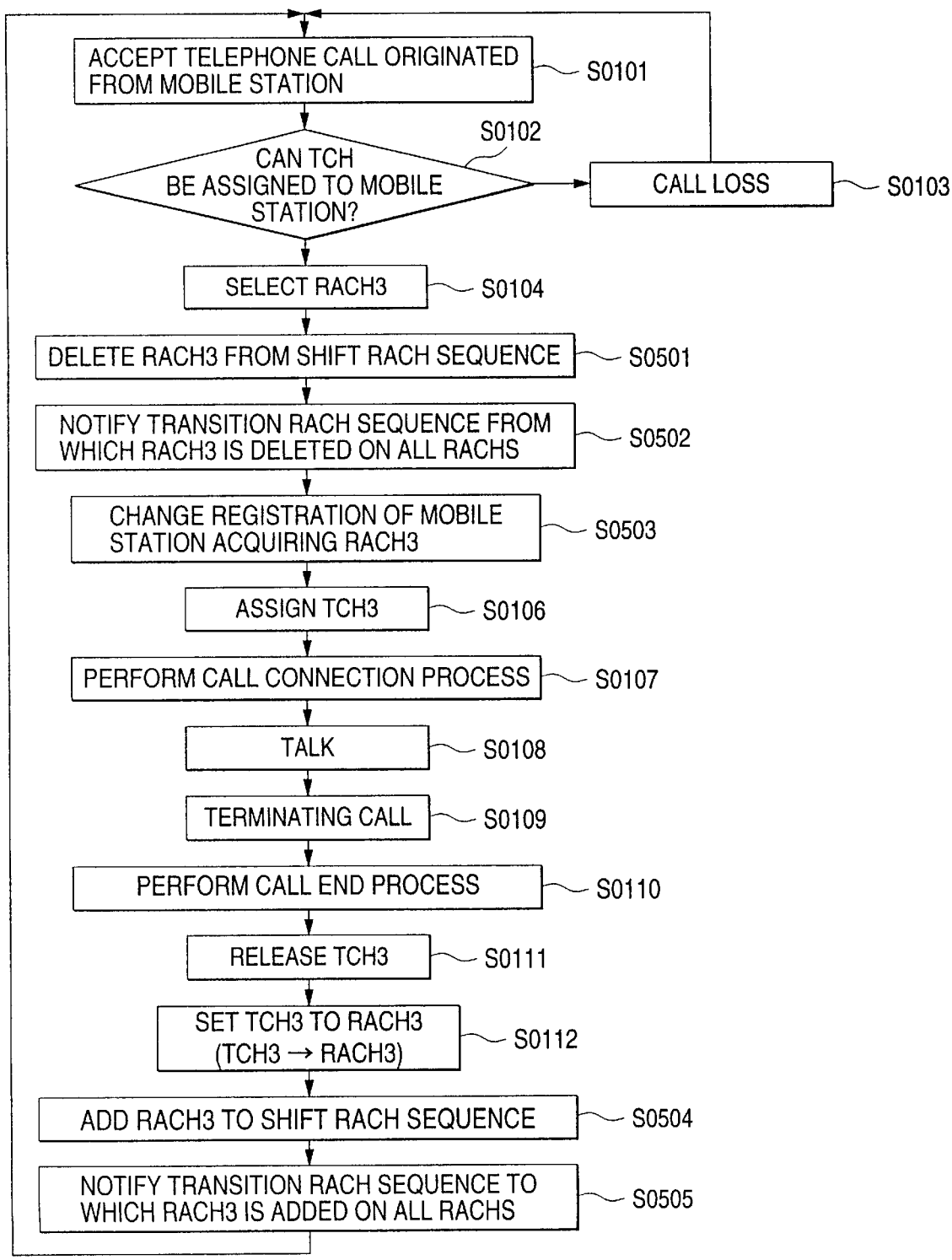
FIG. 14 is a flowchart showing one embodiment of an RACH management system in the base station controller.

FIG. 13 is a table (Table 1) showing one embodiment representing the correspondence between RACH and mobile station numbers registered in the base station controller in the invention and a diagram showing one embodiment of the RACH transition state in the invention. FIG. 14 is a flowchart showing one embodiment of an RACH management system in the base station controller in the invention.

A base station or the base station controller determines shift destination RACHs cyclically for the RACHs managed by the base station, for example, as a shift destination RACH sequence of RACH1→RACH2→RACH3→RACH1 if the base station manages three RACHs.

As the shift destination RACH sequence, all RACHs can be cycled regularly in such a manner that one cyclic sequence is made of two cycles such as RACH1→RACH2→RACH3→RACH1→RACH2→RACH3→RACH1 or that a cyclic sequence is made while a return is made to the shift source RACH alternately such as RACH1→RACH2→RACH1→RACH3→RACH1, or some of the RACHs are used to make a regularly cyclic sequence such as RACH1→RACH2→RACH1.

When a mobile station originates a telephone call in the radio zone formed by the base station, the base station controller accepts the call originated from the mobile station at step S0101, determines whether or not TCHs that can be assigned to the mobile station exist in the base station at step S0102, and selects an available TCH at step S0104. If the TCH is operated as an RACH, the base station controller deletes the RACH operated in the TCH to be allocated to the mobile station from the shift destination RACH sequence and creates a new shift destination RACH sequence at step S0501.

That is, assuming that as in the example, the base station manages three TCHS, operates all TCHs as RACHs, notifies the shift destination RACH sequence as 1, 2, 3, and assigns TCH-3 (RACH-3) to the mobile station for the telephone call, a new created shift destination RACH sequence becomes 1, 2. The shift destination RACH sequence from which TCH-3 assigned to the mobile station is deleted is notified as the new shift destination RACH sequence on all RACHs managed by the base station (in the example, RACH-1, RACH-2, and RACH-3) at step S0502. However, the shift destination RACH sequence is added to a message to the effect that the channel information is changed to a departure state on RACH-3.

The base station controller holds a conversion table indicating the correspondence between the RACH number of the identification number of the RACH acquired by the mobile station and the mobile station number, and rewrites the RACH number corresponding to the mobile station number of the mobile station acquiring the RACH deleted from the shift destination RACH sequence according to the shift destination RACH sequence at step S0503. Further, when the mobile station ends talking at step S0110, the base station controller releases the TCH at step S0111, sets the TCH used by the mobile station for the talking to RACH to operate the TCH as RACH at step S0112, adds the RACH to the shift destination RACH sequence at step S0504, and notifies the shift destination RACH sequence on all RACHs operated by the base station at step S0505.

According to the method, a TCH used for an RACH can be assigned to a telephone call and the mobile station using the RACH can be shifted to another RACH, so that the channel use efficiency of the TCHs managed by the base station can be enhanced. In addition, if a shift destination channel among RACHs operated in a single base station is specified in a cyclic sequence and a telephone call is assigned to a TCH used for an RACH, the mobile station acquiring the RACH can autonomously shift to the shift destination RACH notified from the base station for transmitting and receiving a packet. Further, when the mobile station makes a channel shift, if it cannot receive the RACH, the mobile station can also shift to the next RACH in the cyclic sequence for trying packet transmission.

Embodiment 6

Figure 15:
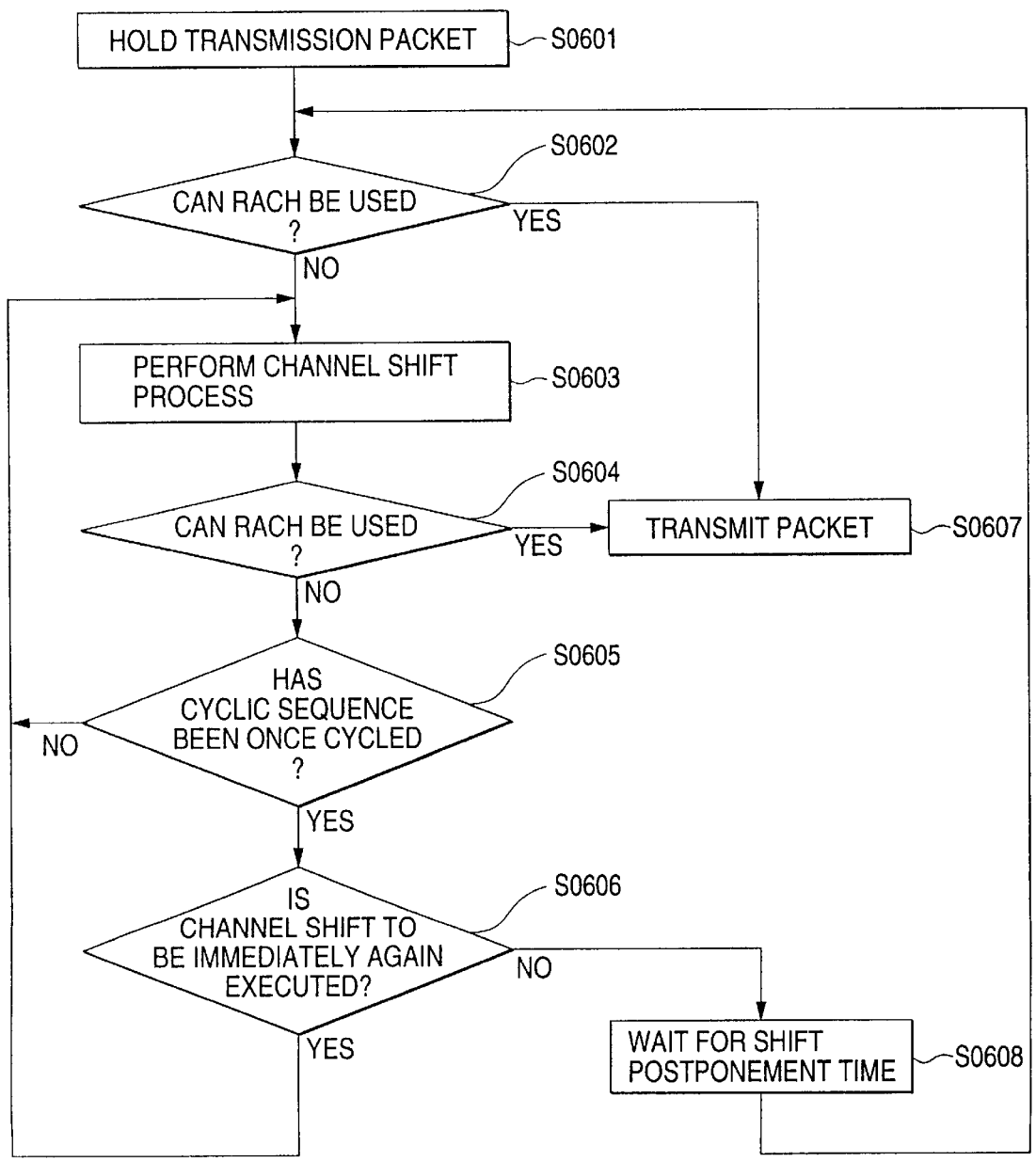
FIG. 15 is a flowchart showing one embodiment of a mobile station channel shift method in a mobile station.

FIG. 15 is a flowchart showing one embodiment of a mobile station channel shift method in a mobile station in the invention.

When a mobile station has a transmission packet at step S0601, it determines whether or not the packet can be transmitted on the acquired RACH at step S0602. If it cannot be transmitted on the RACH (No at step S0602), a channel shift process is executed at step S0603 according to the cyclic sequence notified from the corresponding base station. After the channel shift, again whether or not the packet can be transmitted using the shift destination RACH is determined at step S0604.

If the packet cannot be transmitted (No at step S0604), whether or not the cyclic sequence notified from the base station has been once cycled is determined at step S0605. If it is not once cycled (No at step S0605), again the channel shift process is executed at step S0603. If the cyclic sequence has been once cycled (Yes at step S0605), whether or not channel shift is immediately again repeated is determined at step S0606. To make this determination, for example, random numbers are generated, probability Pb is calculated, and whether or not it exceeds a threshold value is determined. Channel shift is immediately executed at probability Pb (Yes at step S0606) or is delayed only for predetermined time Tb at probability 1-Pb (No at step S0606). While the shift is postponed, the mobile station waits for packet transmission on the first acquired RACH. The threshold value may be changed in response to the state of each mobile station.

According to the method, since registration of mobile stations managed by the base station or the base station controller is the first RACH at which the mobile station starts channel shift, the time acquiring the shift start channel by the mobile station is prolonged, thereby raising the call incoming success possibility and decreasing the probability that mobile stations will execute an RACH shift at the same time. Thus, the probability that they will send a segment at the same timing on the shift destination RACH is also decreased, reducing the segment collision probability, resulting in an increase in the channel use efficiency.

Embodiment 7

Figure 16:
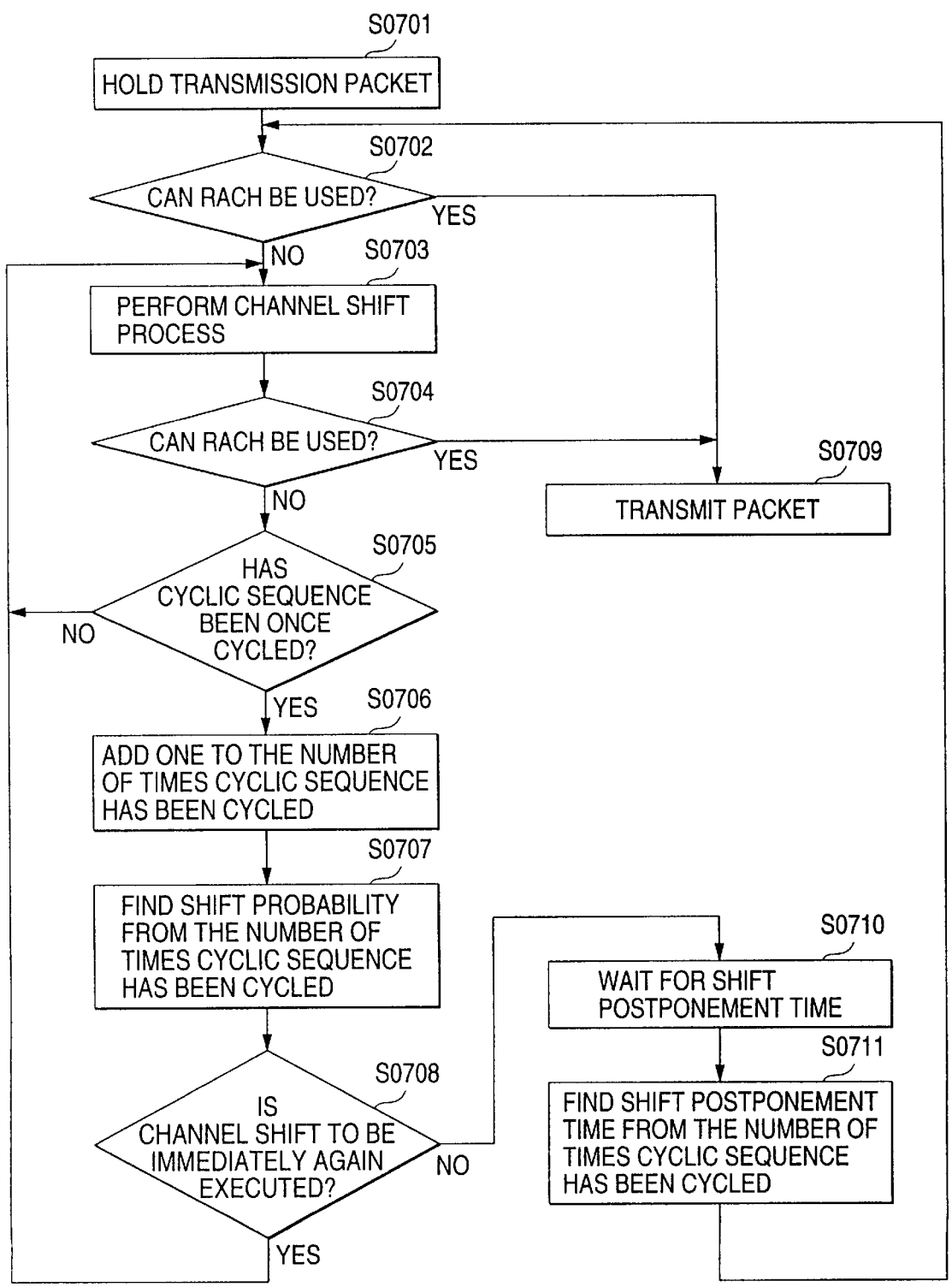
FIG. 16 is a flowchart showing one embodiment of a channel shift method.

FIG. 16 is a flowchart showing one embodiment of a channel shift method in the invention. When a mobile station attempting to transmit a packet cannot transmit it and executes a channel shift according to the cyclic sequence notified from the corresponding base station and then once cycles the cyclic sequence, the probability for immediately executing channel shift and the postponement time when the shift is postponed are changed in response to the number of times the cyclic sequence has been cycled. For example, when the cyclic sequence has been once cycled (Yes at step S0705), the number of times the cyclic sequence has been cycled is incremented by one at step S0706 and the shift probability is changed from the resulting number of times at step S0707. Then, whether or not the shift is immediately continued is determined at step S0708 by using the shift probability found at step S0707. If the channel shift is not executed (No at step S0708), the shift postponement time is found from the number of times the cyclic sequence has been cycled at step S0710, and the channel shift is postponed for the postponement time at step S0711. While the channel shift is postponed, the mobile station waits for packet transmission on the first acquired RACH.

According to the method, since registration of mobile stations managed by the base station or the base station controller is the first RACH at which the mobile station starts channel shift, the time acquiring the shift start channel by the mobile station is prolonged, thereby raising the call incoming success possibility and decreasing unnecessary channel shift of the mobile stations.

Embodiment 8

Figure 17:
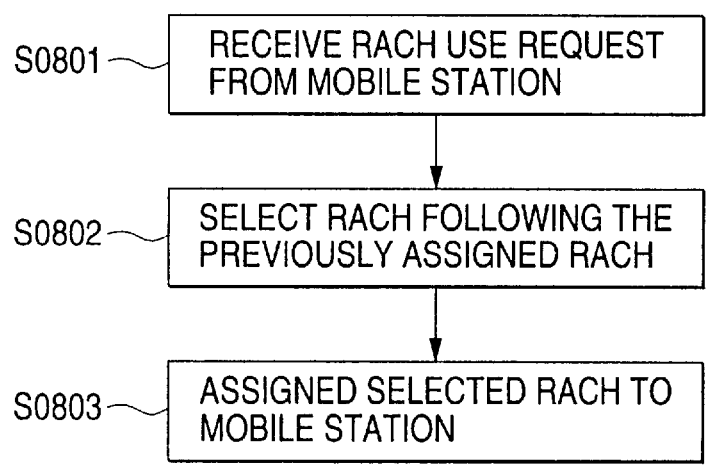
FIG. 17 is a flowchart showing one embodiment of a channel assignment system in the base station controller.

FIG. 17 is a flowchart showing one embodiment of a channel assignment system in the base station controller in the invention. For example, assume that a base station manages three RACHs #1, #2, and #3 and that the base station controller sets the assignment order of RACHs to mobile stations as #1 followed by #2 followed by #3 followed by #1. The base station controller receives an RACH use request from a mobile station at step S0801. If the base station controller assigned RACH#2 in the preceding request, it selects RACH#3 following RACH#2 at step S0802 and notifies the requesting mobile station of use of RACH#3 at step S0803. When receiving another RACH use request from another mobile station, the base station controller assigns RACH#1.

According to the method, since the RACH assigned from the base station to the mobile station at the RACH use time varies from one mobile station to another, the mobile stations can be distributed to all RACHs managed by the base station and the number of mobile stations contending with each other on the same RACH can be decreased, shortening the wait time for sending a packet.

Embodiment 9

Figure 18:
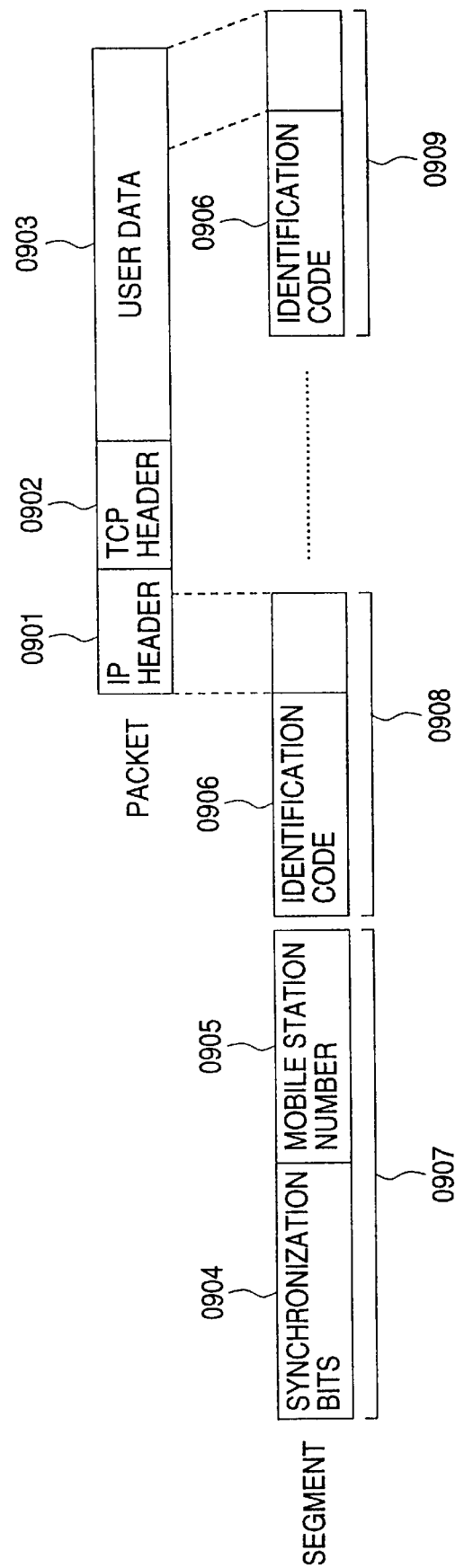
FIG. 18 is an illustration showing one embodiment of a segment construction method in a mobile station.
Figure 19:
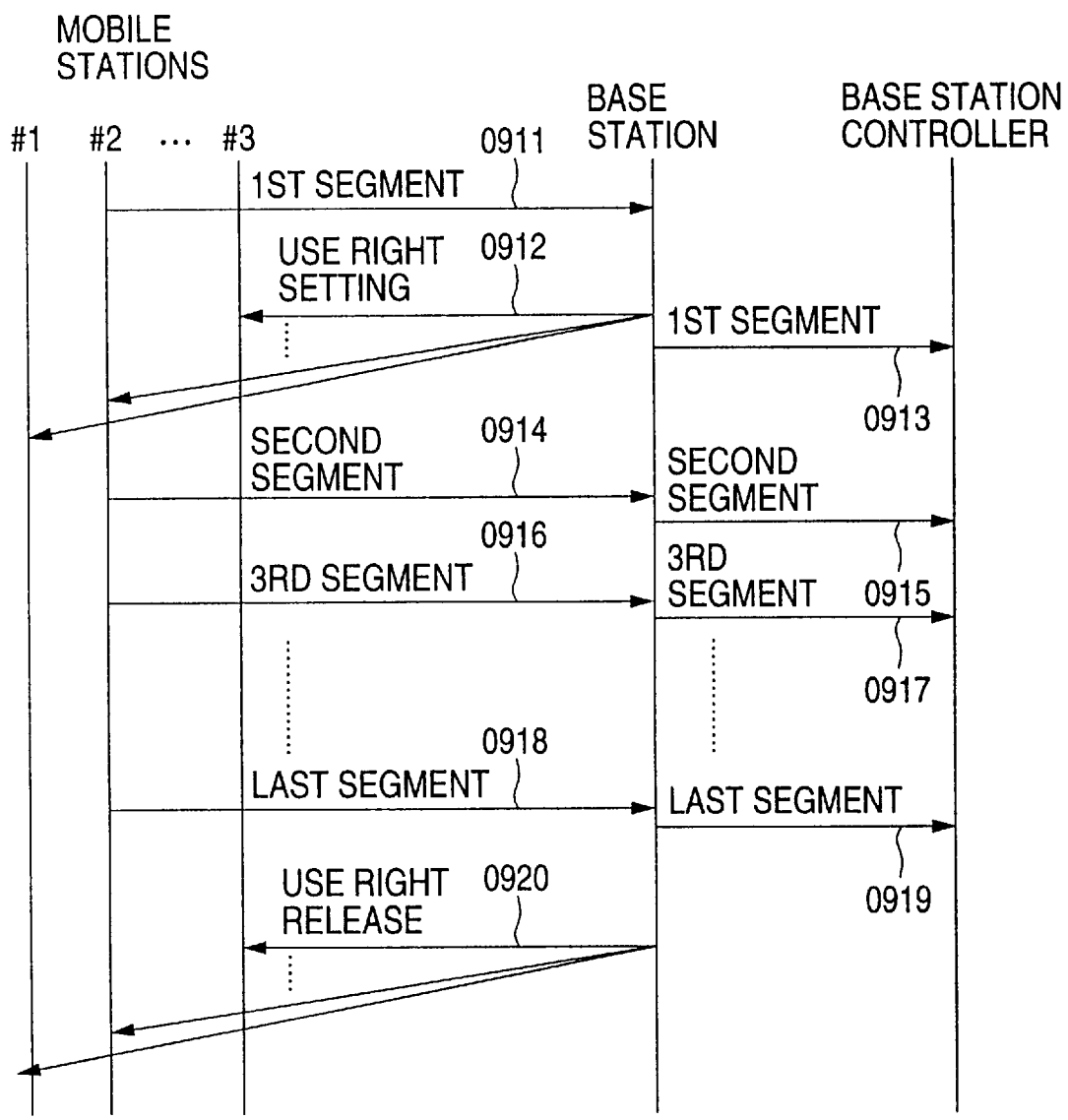
FIG. 19 is a sequence chart showing one embodiment of a line contention method.

FIG. 18 is an illustration showing one embodiment of a segment construction method in a mobile station in the invention. FIG. 19 is a sequence chart showing one embodiment of a line contention method in the invention.

FIG. 18 shows an example in which a packet containing IP header 0901, TCP header 0902, and user data 0903 sent to a LAN is divided in a size that can be sent by TDMA in a radio zone. Each division to which an identification code 0906 for identifying the division order, etc., is added is called a segment. A synchronization bit 0904 for synchronizing up link of RACH and a mobile station number 0905 for identifying a mobile station also make up a segment, which 0907 is created in the mobile station at the packet transmission time. The segment 0907 made up of the synchronization bits and the mobile station number is first transmitted before packet transmission and therefore is called the first segment, which is followed by the second segment 0908, . . . , last segment 0909 in the transmission order.

Next, the packet transmission operation will be discussed. Assume that mobile station #2 uses one RACH to transmit a packet in FIG. 19. First, the mobile station #2 transmits the first segment containing the synchronization bits and the mobile station number for identifying the mobile station #2 to a base station at 0911.

The base station, which normally receives the first segment, synchronizes up RACH between the mobile station and the base station, and determines that the use right of the RACH is granted to the mobile station #2. Then, the base station uses the down link of RACH attendant control channel corresponding to the RACH to notify, with use right setting at 0912, the mobile station #2 that the mobile station #2 is granted the use right of the RACH and the mobile stations acquiring the RACH other than the mobile station #2 (mobile stations #1 and #3) that the mobile stations #1 and #3 are disabled from transmitting a packet, and transmits the first packet to the base station controller at 0913.

The mobile station #2 recognizes that the use right of the RACH is granted, and transmits the second and later segments in which the packet information is set to the base station, which then transmits the received segments to the base station controller. When the base station receives the last segment from the mobile station #2 at 0918, it notifies the mobile stations that the right use of the RACH granted to the mobile station #2 is released with use right release at 0920. The mobile stations acquiring the RACH other than the mobile station #2 cannot transmit segments between reception of the use right setting at 0912 and reception of the use right release at 0920.

According to the method, since the segment containing the synchronization bits is used for contention control, the mobile station need not take up synchronization at the RACH assignment time and at the shift time. Since each mobile station can acquire the RACH use right in units of packets that can be sent onto the LAN, the base station controller can assemble segments consecutively sent from the mobile station in the reception order for reconstructing a packet that can be sent to the LAN, simplifying the packet reconstruction process.

Embodiment 10

Figure 20:
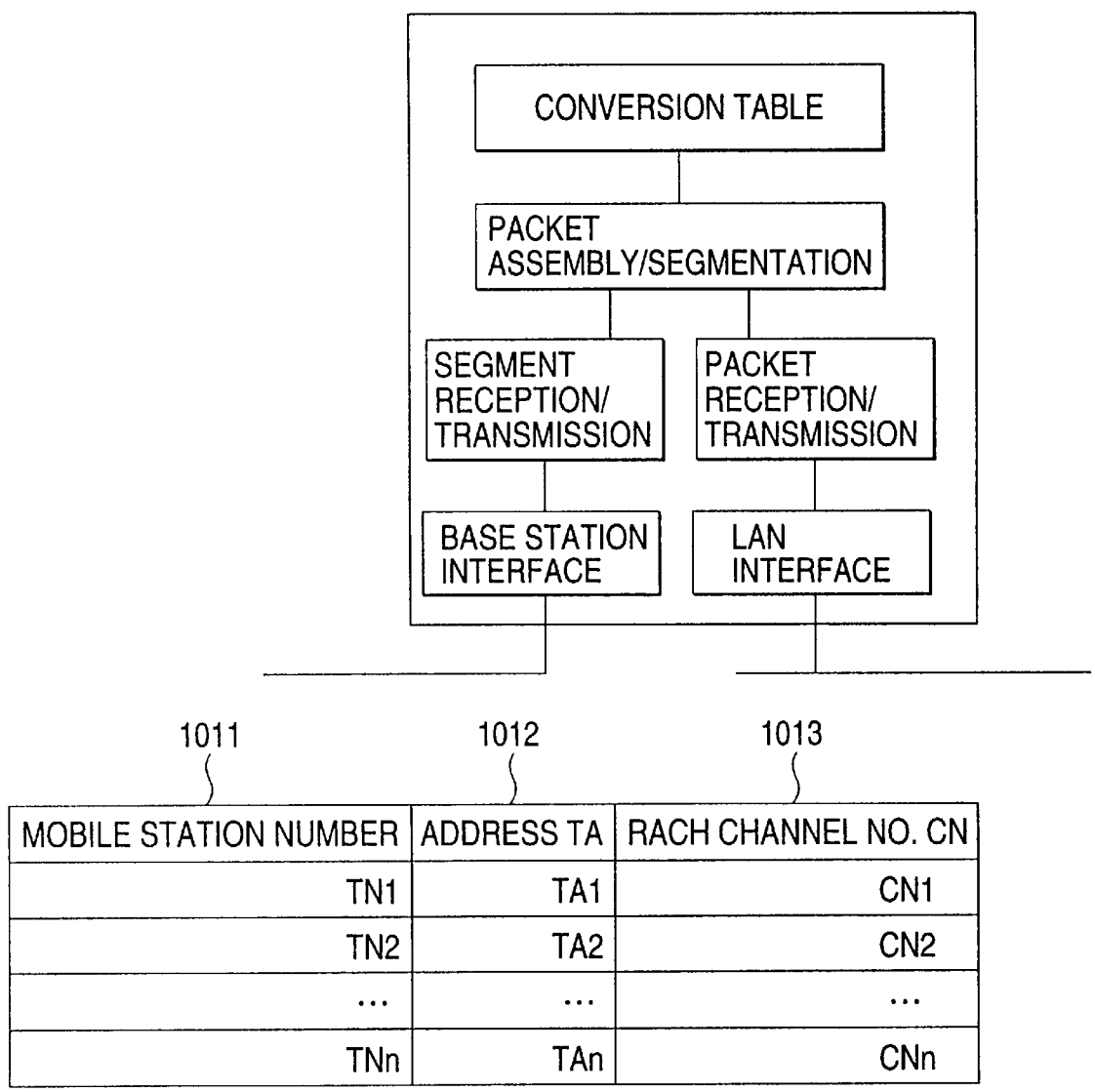
FIG. 20 is a block diagram showing one embodiment of the configuration of the base station controller and is a table showing one example of entries of a conversion table registered in the base station controller.
Figure 21:
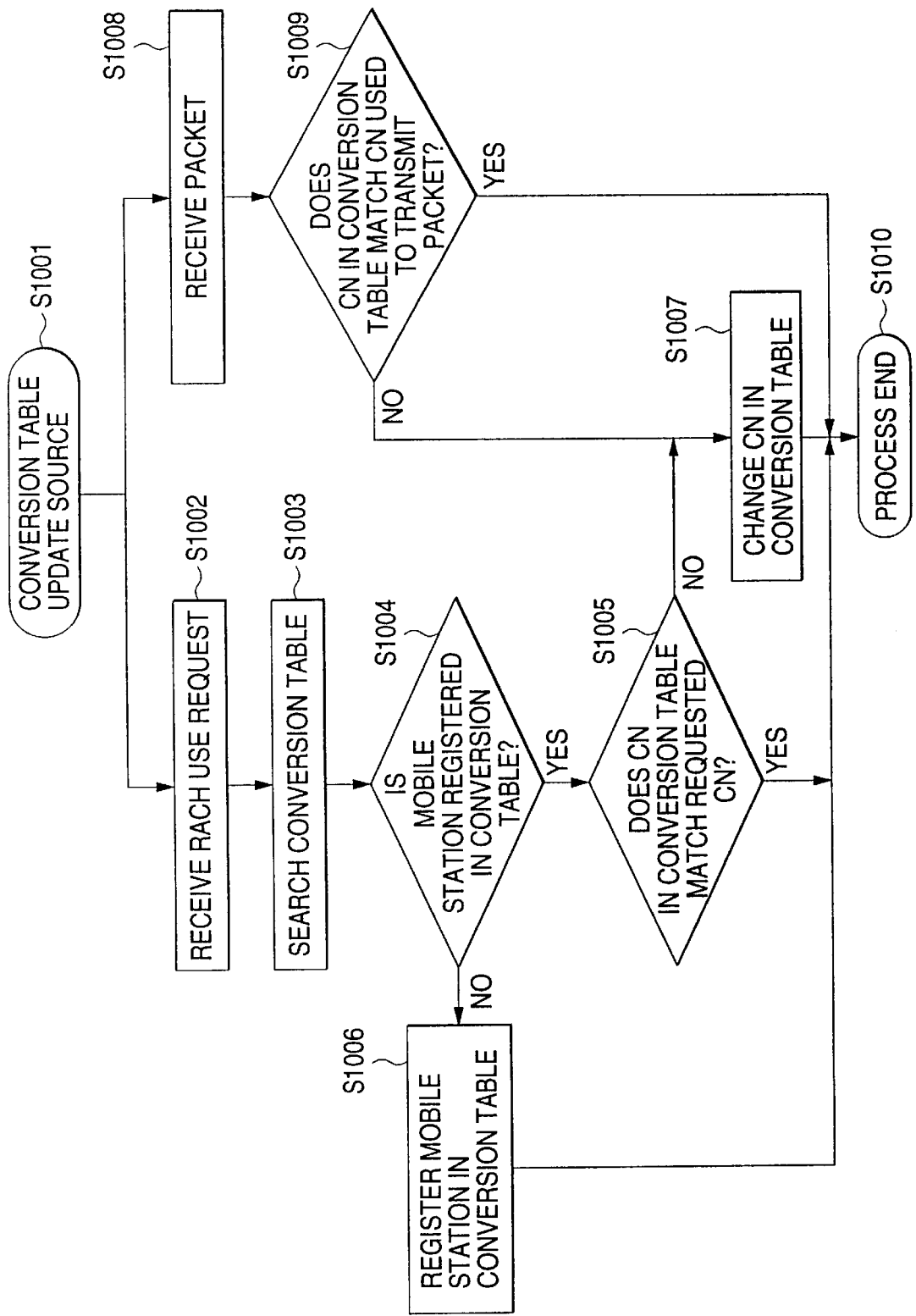
FIG. 21 is a flowchart showing one embodiment of a conversion table management method in the base station controller.

FIG. 20 is a block diagram showing one embodiment of the configuration of the base station controller in the invention and also provides a table (Table 2) showing one embodiment of entries of a conversion table registered in the base station controller in the invention. FIG. 21 is a flowchart showing one embodiment of a conversion table management method in the base station controller in the invention.

Move management of mobile stations for transmitting and receiving a packet between the mobile stations and a LAN will be discussed. As shown in FIG. 20, the base station controller 1001 has a LAN interface function 1008 for connecting to the LAN, a packet reception/transmission function 1007 for receiving a packet from the LAN and transmitting a packet to the LAN, a base station interface function 1005 for connecting to base stations, a segment reception/transmission function 1004 for receiving segments via base stations from mobile stations and transmitting segments via base stations to mobile stations, a packet assembly/segmentation function 1003 for assembling segments destined for the LAN from a mobile station into a packet and dividing a packet destined for a mobile station from the LAN into segments, and the conversion table 1002 for holding information for managing a move of the mobile stations. For example, as listed in Table 2, the conversion table 1002 sets mobile station numbers TNs 1011 for uniquely identifying the mobile stations, addresses TAs 1012 for identifying the mobile stations in the LAN, and RACH channel numbers CNs 1013 indicating RACHs acquired by the mobile stations.

Updating the conversion table 1002 will be discussed with reference to FIG. 21. The conversion table 1002 is updated upon reception of an RACH use request from a mobile station or a packet transmitted from a mobile station to the LAN. When receiving an RACH use request from a mobile station at step S1002, the base station controller 1001 searches the conversion table 1002 for information concerning the mobile station transmitting the use request at step S1003.

For example, if the mobile station TN2 transmits an RACH CN3 use request, the base station controller 1001 determines whether or not the mobile station TN2 is registered in the conversion table 1002 at step S1004. In this case, since the mobile station TN2 is registered in the conversion table 1002 as listed in Table 2 (Yes at step S1004), the base station controller 1001 checks to see if the entry of the CN 1013 in the conversion table corresponding to the mobile station TN2 is CN3 at step S1005. Since the CN corresponding to the TN2 is CN2 in Table 2, the base station controller 1001 changes the CN in the conversion table to CN3 at step S1007. If an RACH use request is received from a mobile station not registered in the conversion table, the TN and TA of the mobile station and the CN requested by the mobile station are set in the conversion table at step S1006.

Next, when receiving a packet destined for the LAN over the RACH channel CN2 from the mobile station TN1 at step S1008, the base station controller 1001 compares the CN used to transmit the packet with the CN corresponding to the mobile station TN1 in the conversion table at step S1009. In the example listed in Table 2, since the CNs do not match as a result of the comparison, the CN in the conversion table is changed to CN2 at step S1007. The conversion table for position management of the mobile stations is thus updated.

According to the method, the base station controller converts and manages the terminal identifiers used in the LAN and those used in the radio communication system, thus processing can be performed in the LAN without being concerned with a move of the mobile stations and the base station controller needs only to assemble segments consecutively sent from a mobile station in the sequence number into a packet that can be sent to the LAN, simplifying the packet reconstruction process.

Embodiment 11

Figure 22:
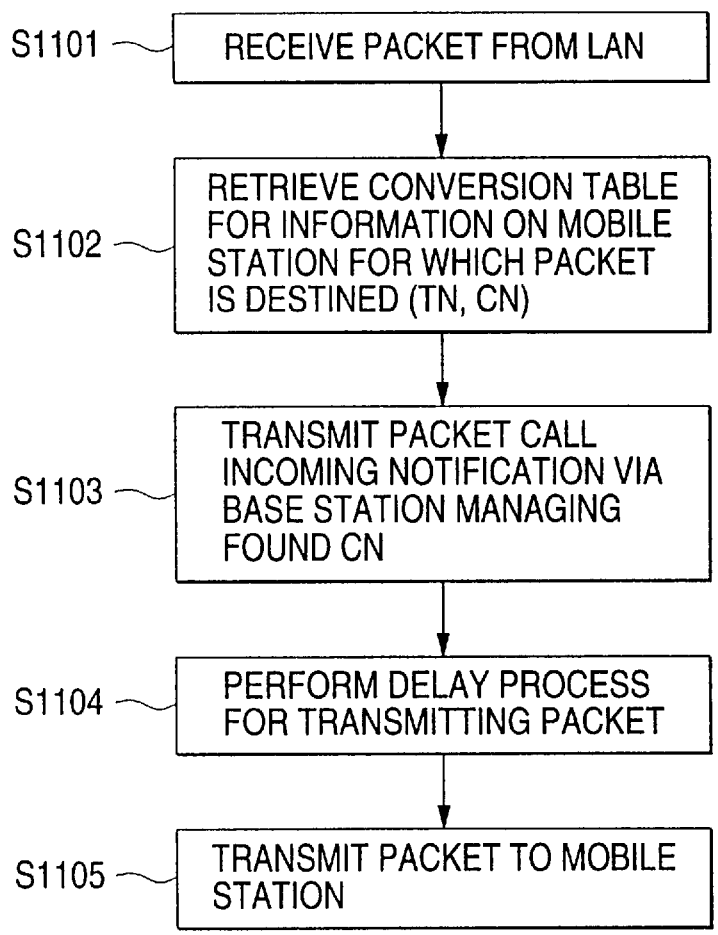
FIG. 22 is a flowchart showing one embodiment of a packet incoming process in the base station controller.
Figure 23:
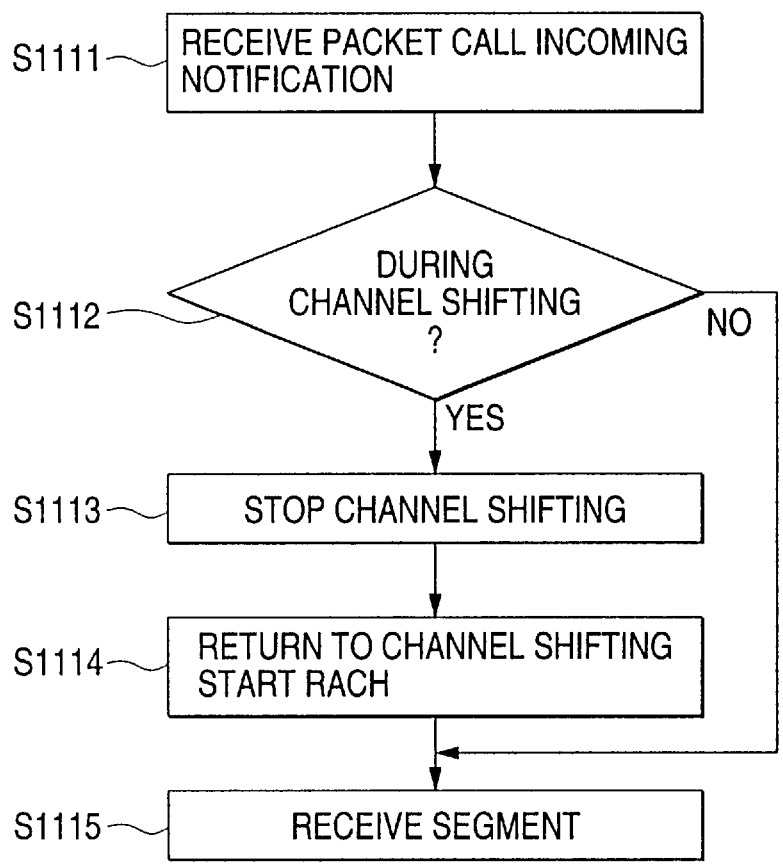
FIG. 23 is a flowchart showing one embodiment of a packet incoming process in a mobile station.
Figure 24:
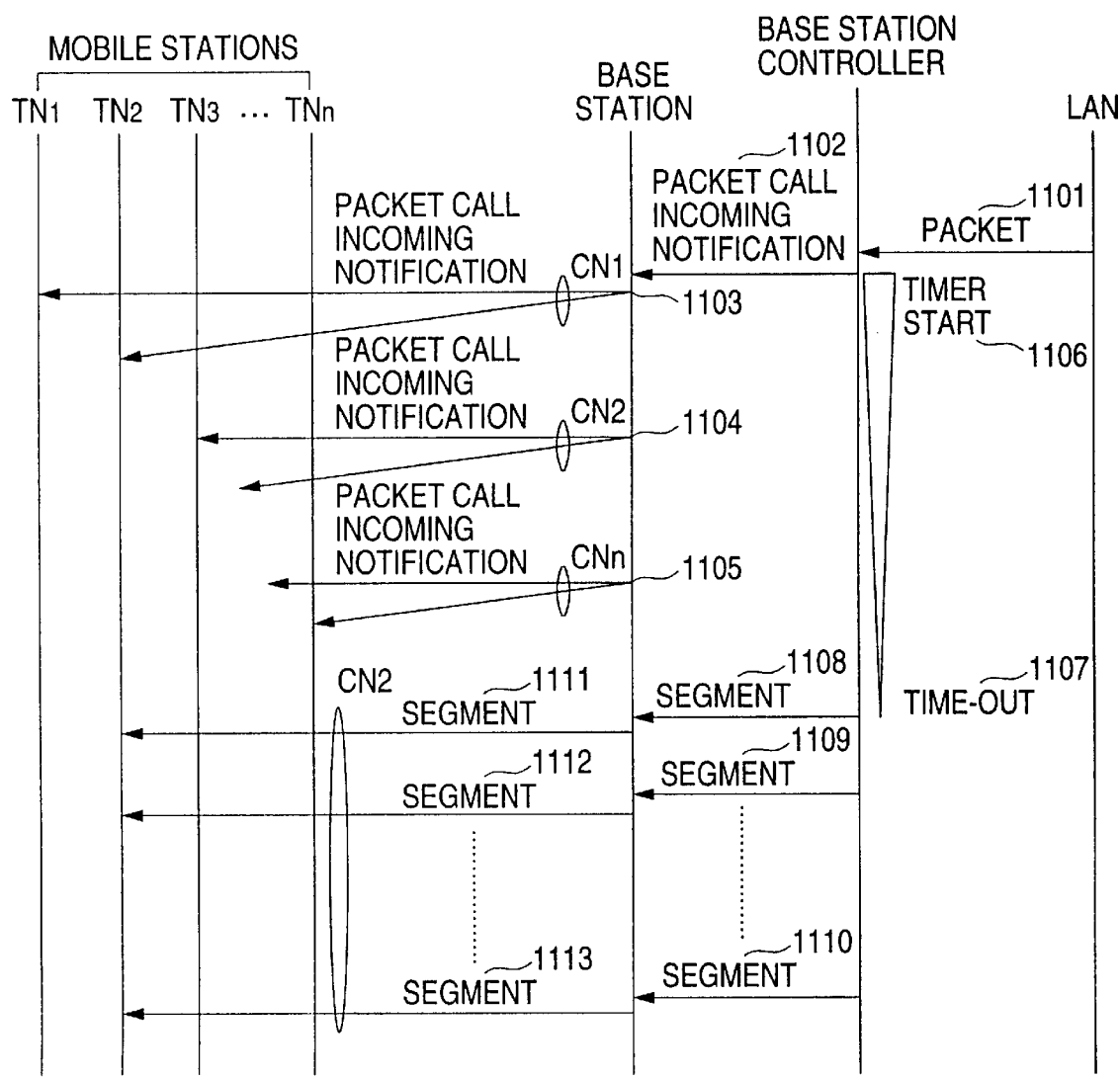
FIG. 24 is a sequence chart between mobile stations and the base station controller showing one embodiment of a packet incoming system.

FIG. 22 is a flowchart showing one embodiment of a packet incoming process to a mobile station which autonomously shifts from one RACH to another, in the base station controller in the invention. FIG. 23 is a flowchart showing one embodiment of a packet incoming process in a mobile station which autonomously shifts from one RACH to another in the invention. FIG. 24 is a sequence chart between mobile stations and the base station controller showing one embodiment of a packet incoming system in the invention.

A process performed when the base station controller receives a packet destined for a mobile station from the LAN will be discussed. When the base station controller receives a packet from the LAN at step S1101 in FIG. 22, it searches the conversion table (1002 in FIG. 20) contained in the base station controller for information concerning the mobile station for which the packet is destined and finds the mobile station number TN of the mobile station and the RACH channel number CN acquired by the mobile station at step S1102. The base station controller transmits a packet incoming notification via the base station managing the found CN to the mobile station for which the packet is destined at step S1103. Here, the packet incoming notification is sent to the base station at 1102 in FIG. 24, which then passes on the received notification for each RACH over the down attendant control channels of all managed RACHs at 1103–1105. For example, assume that the mobile station TN2 is the packet destination and is shifting from RACH channel CN2 to CN1. After receiving the packing incoming notification on CN1 at step S1111 in FIG. 23, the mobile station TN2 is shifting from CN2 to CN1 (Yes at step S1112) and therefore stops the channel shifting at step S1113 and returns to CN2 of the channel shifting start RACH at step S1114.

After transmitting the packet incoming notification to the base station, to wait for the packet incoming notification transmission process from the base station to the mobile stations, the channel shifting stop process of the mobile station, and the return process of the mobile station to the channel shifting start RACH, the base station controller starts a timer at 1106 and waits for the timer to time out at 1107, thereby executing a delay process for transmitting the packet at step S1104. After the delay process, the base station controller transmits the packet to the mobile station TN2 at step S1105. To transmit the packet, the base station controller divides the packet into segments, specifies the RACH channel number CN2 for the base station, and transmits the segments to the base station at 1108–1110. The base station passes on the received segments to the mobile station over CN2 at 1111–1113.

According to the method, since move management is executed without explicitly registering positions from mobile stations, the traffic for registering the positions is decreased. Also, since the RACHs acquired by the mobile stations are managed with the TCH channel numbers CNs, an incoming packet can also be transmitted on the TCH having the corresponding CN to a mobile station which autonomously shifts from one RACH to another, thereby enabling a packet incoming call.

Embodiment 12

Figure 25:
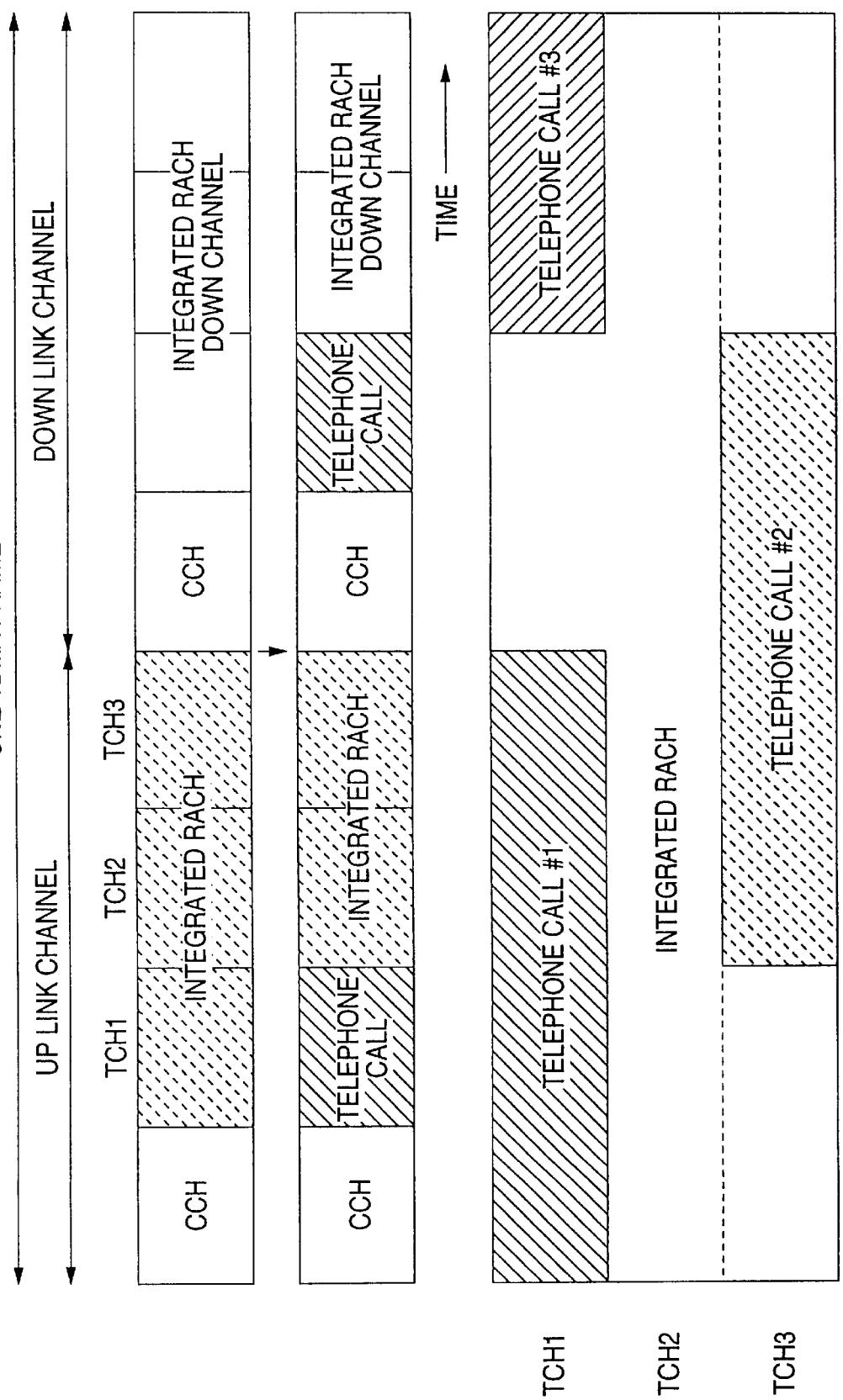
FIG. 25 is an RACH state transition diagram when a TDMA system is used as a radio access system.
Figure 26:
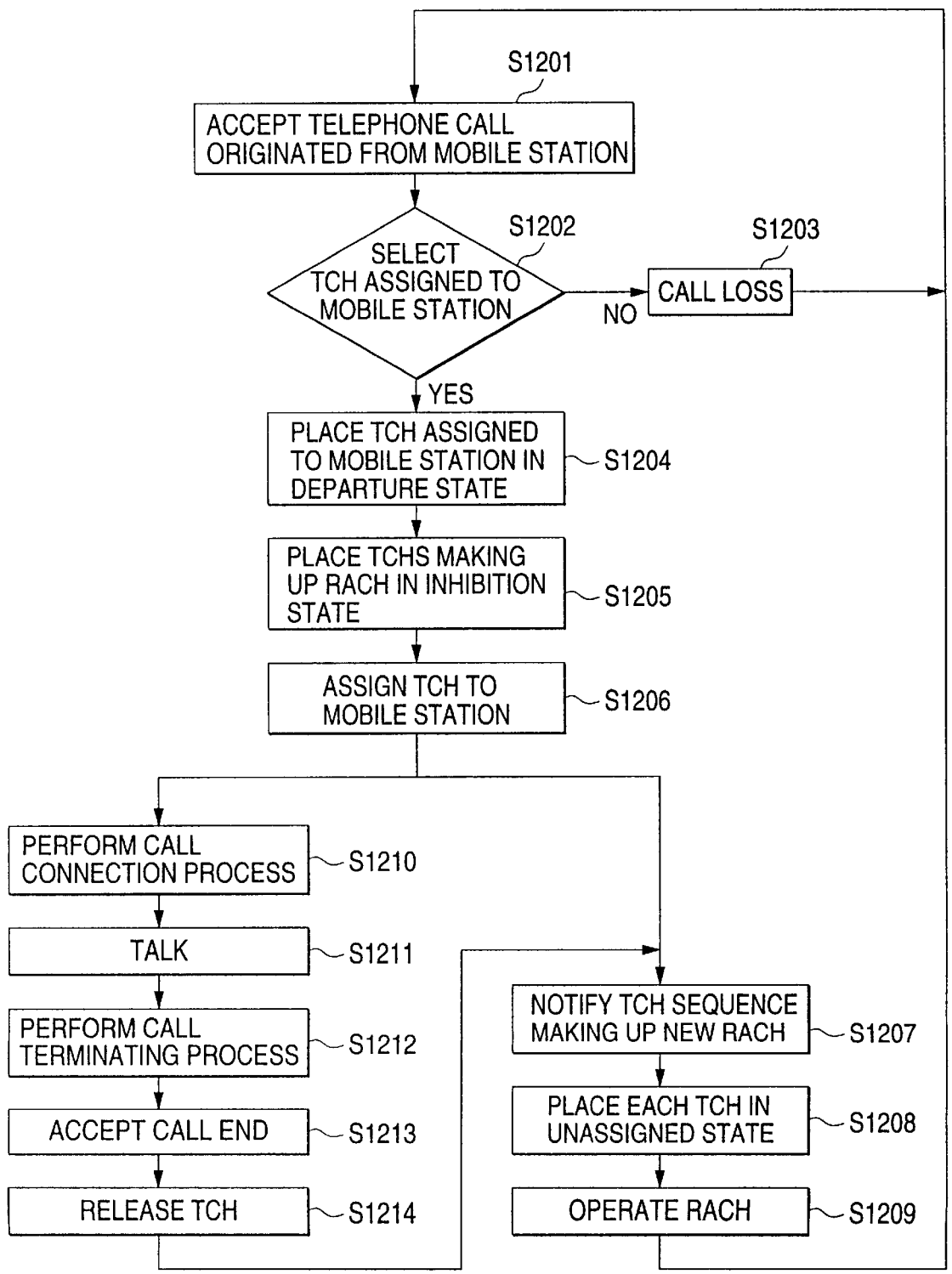
FIG. 26 is a flowchart showing one embodiment of RACH management in the base station controller.

FIG. 25 is a diagram showing one embodiment of the RACH state transition when the TDMA system is used as a radio access system in the invention. FIG. 26 is a flowchart showing one embodiment of RACH management in the base station controller in the invention.

Base stations and the base station controller handle different TCHS unused for telephone calls among predetermined TCHs logically as one RACH. If a mobile station having a data transmission request sends the first segment on each TCH and the corresponding base station can receive it normally, the mobile station has access to all TCHs making up the RACH and can send the second and later segments on all the TCHs making up the RACH. One RACH is set for each base station.

When accepting a telephone call originated from a mobile station at step S1201, if an unassigned TCH other than the TCHs predetermined to be used for the integrated RACH, namely, an RACH operated with one TCH does not exist, the base station controller selects a TCH assigned to the mobile station from the TCHs making up the integrated RACH at step S1202, places the selected TCH in the departure state, and notifies on a down channel at step S1204. Next, the base station controller places the TCHs making up the integrated RACH except the selected TCH in the inhibition state for limiting segment sending on the integrated RACH at step S1205. Next, it assigns the TCH to the mobile station at step S1206 and executes a call connection process, and starts talking at step S1211. The base station and the base station controller notify a TCH sequence making up a new RACH on the TCHs making up the old RACH except the TCH assigned to the telephone call at step S1207. Next, the base station controller places the TCHs making up the TCH sequence in the unassigned state at step S1208 and operates the new RACH at step S1209.

Next, when the telephone call ends and the base station and the base station controller accept the call end at step S1213, the base station controller releases the TCH at step S1214, forms a new RACH to which the released TCH is added, notifies the mobile station of the TCH sequence on the down link, and places the added TCH in the unassigned state.

According to the method, since a plurality of TCHs are handled as one RACH, a high-speed RACH can be formed. Also, since the high-speed RACH is formed using predetermined TCHS, processing of segments transmitted from the high-speed RACH can be simplified in the base station and the base station controller.

Embodiment 13

Figure 27:
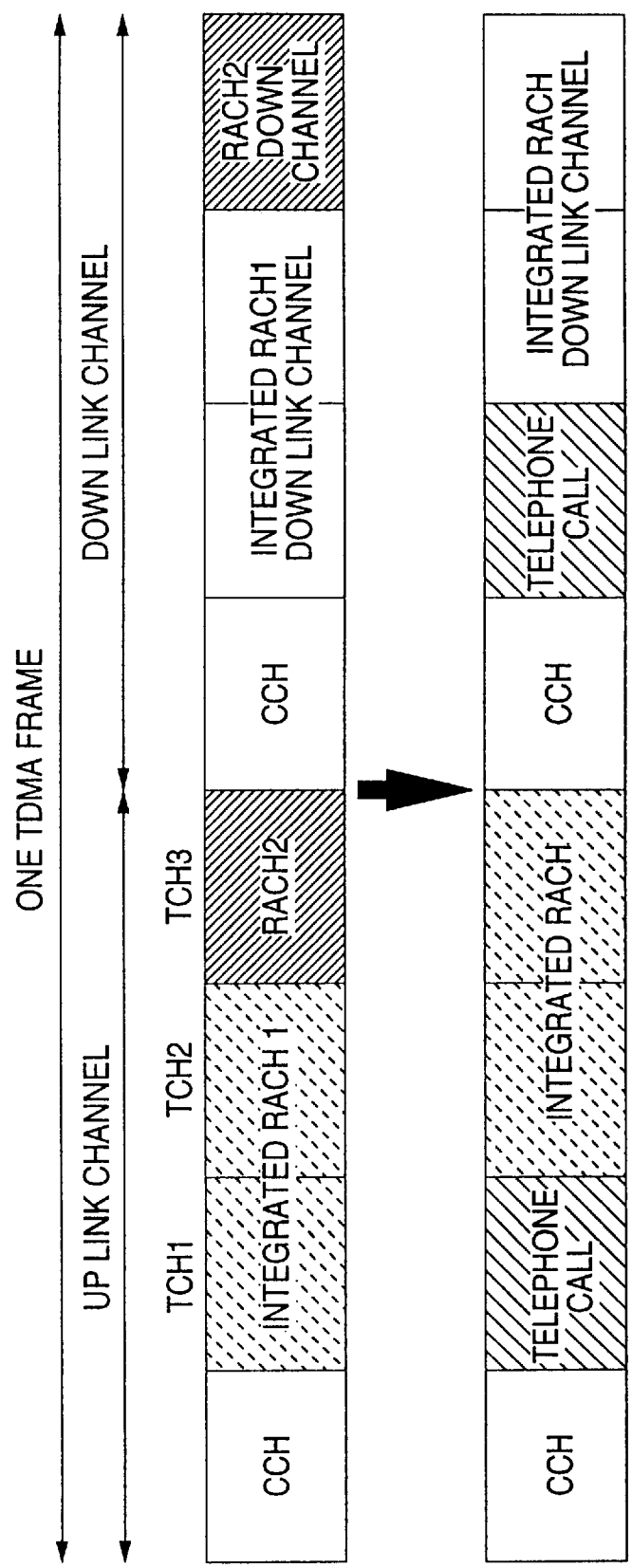
FIG. 27 is a diagram showing one embodiment of the RACH state transmision when the TDMA system is used as a radio access system.
Figure 28:
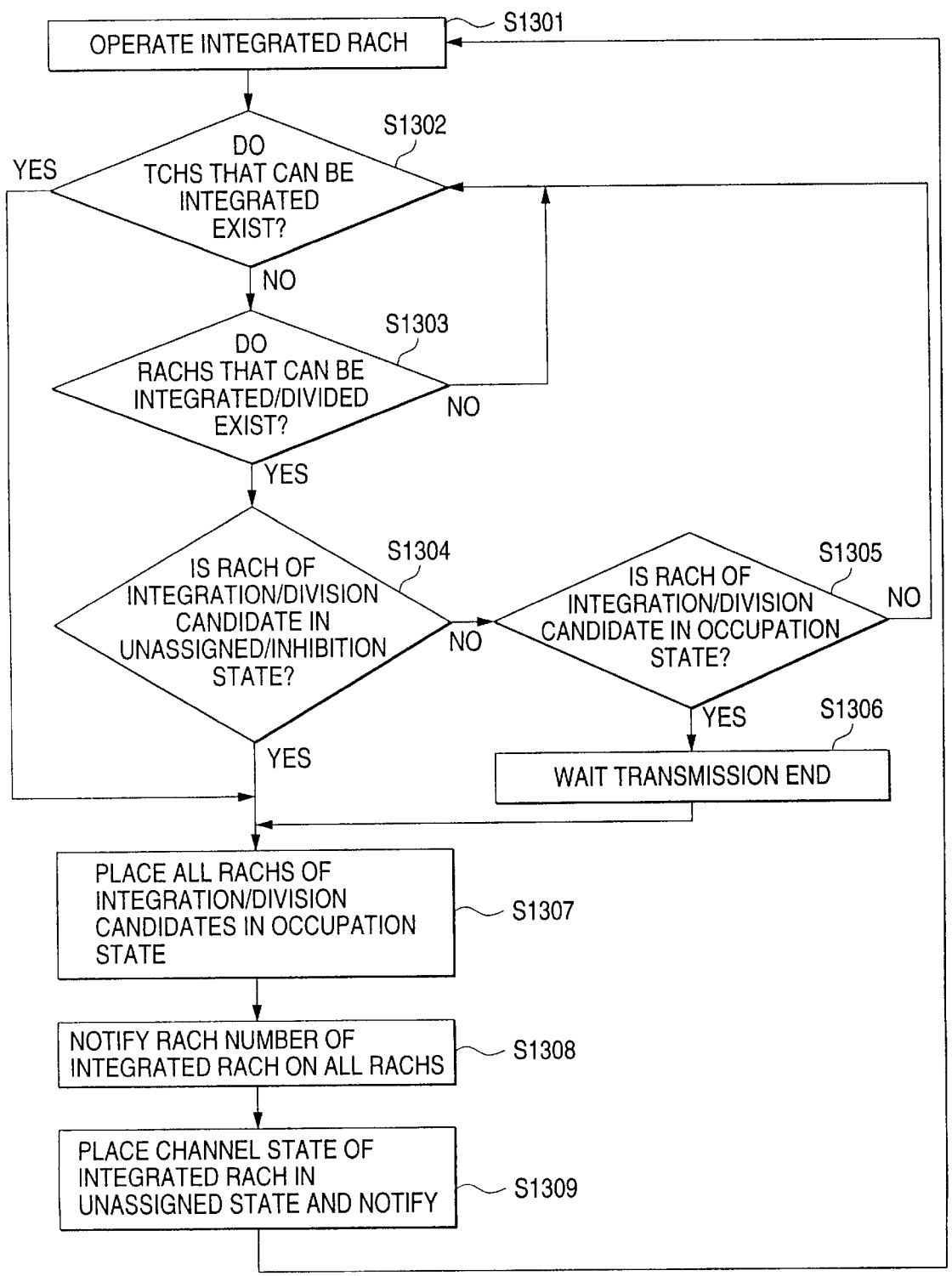
FIG. 28 is a flowchart showing one embodiment of RACH management in the base station controller.

FIG. 27 is a diagram showing one embodiment of the RACH state transmission when the TDMA system is used as a radio access system in the invention. FIG. 28 is a flowchart showing one embodiment of RACH management in the base station controller in the invention.

If an unassigned TCH accompanying the telephone call end exists at step S1302, the base station and the base station controller judge the number of RACHs managed by the base station at step S1302. If more than one RACH exists, the possibility of integrating/dividing the RACHs is judged. To integrate the RACHS, the mobile station side must be able to access both of the integrated RACHS. Thus, if the radio access system is the TDMA/TDD system, RACH on the same time slot cannot be integrated unless the mobile station has a plurality of transmitters/receivers. If the frequency switch performance of the mobile station is the time for one time slot, it is impossible to integrate RACHs different in frequency on consecutive time slots. Based on this condition, RACH may be divided.

Thus, the base station controller or the base station selects RACH that can be integrated/divided based on the condition on the radio access system or the performance of the mobile station at step S1302. Next, the base station checks the channel state of the RACHs used as integration/division candidates at step S1303. If both are in the unassigned state, they are placed in the inhibition state for inhibiting access right acquisition to the RACH from the mobile station at step S1306. If both or either is in the occupied state, a wait is made for transmission of the data being transmitted on the RACH to end at step S1305. When both RACHs are placed in the inhibition state, the base station controller notifies the RACH numbers of the RACHs to be integrated/divided on all RACHs managed by the base station at step S1307 and changes the integrated RACH channel state from the inhibition to unassigned state for starting access right acquisition on the integrated RACH. The mobile station transmits data on the integrated/divided RACH. If a telephone call is originated, the process of embodiment 12 described above is executed.

According to the method, a plurality of high-speed RACHs can be formed in one base station and a high-speed RACH can be divided into a plurality of RACHS. Also, the transmission speed of the RACH can be changed with the mobile station performance and telephone call traffic. Thus, flexible high-speed data communication channels less affecting telephone calls can be provided.

Embodiment 14

Figure 29:
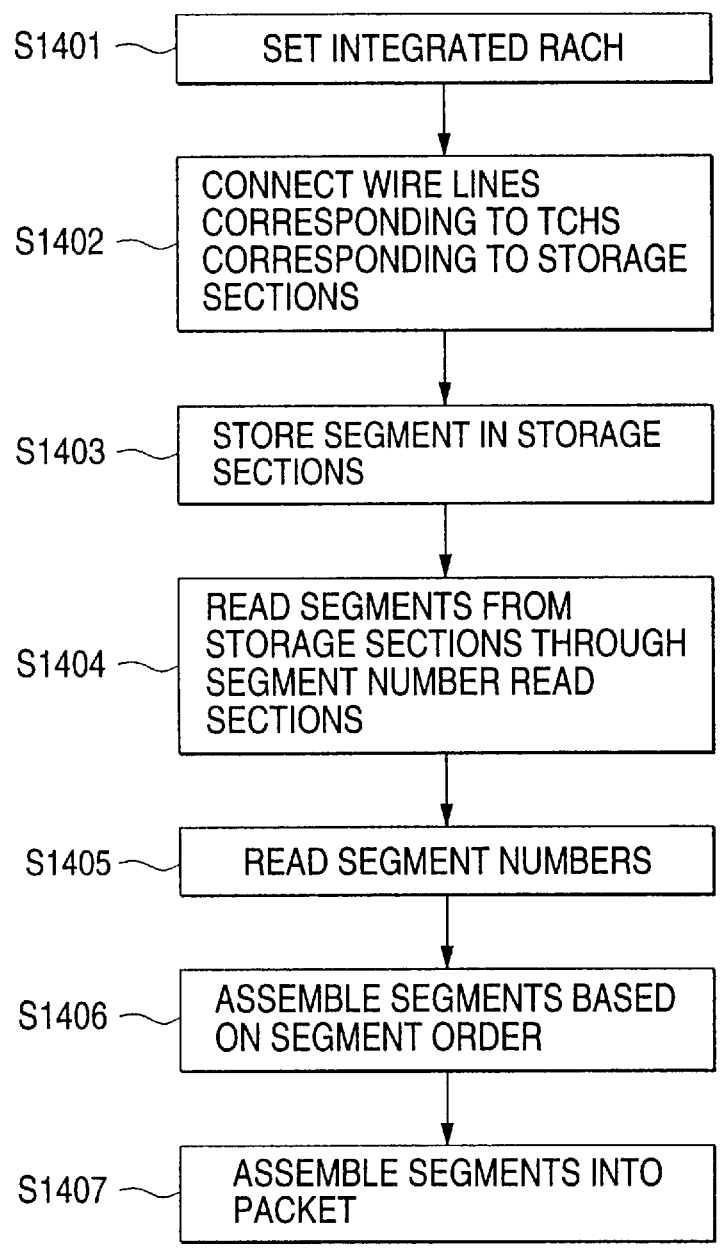
FIG. 29 is a flowchart showing one embodiment of a packet assembling method in the base station controller.
Figure 30:
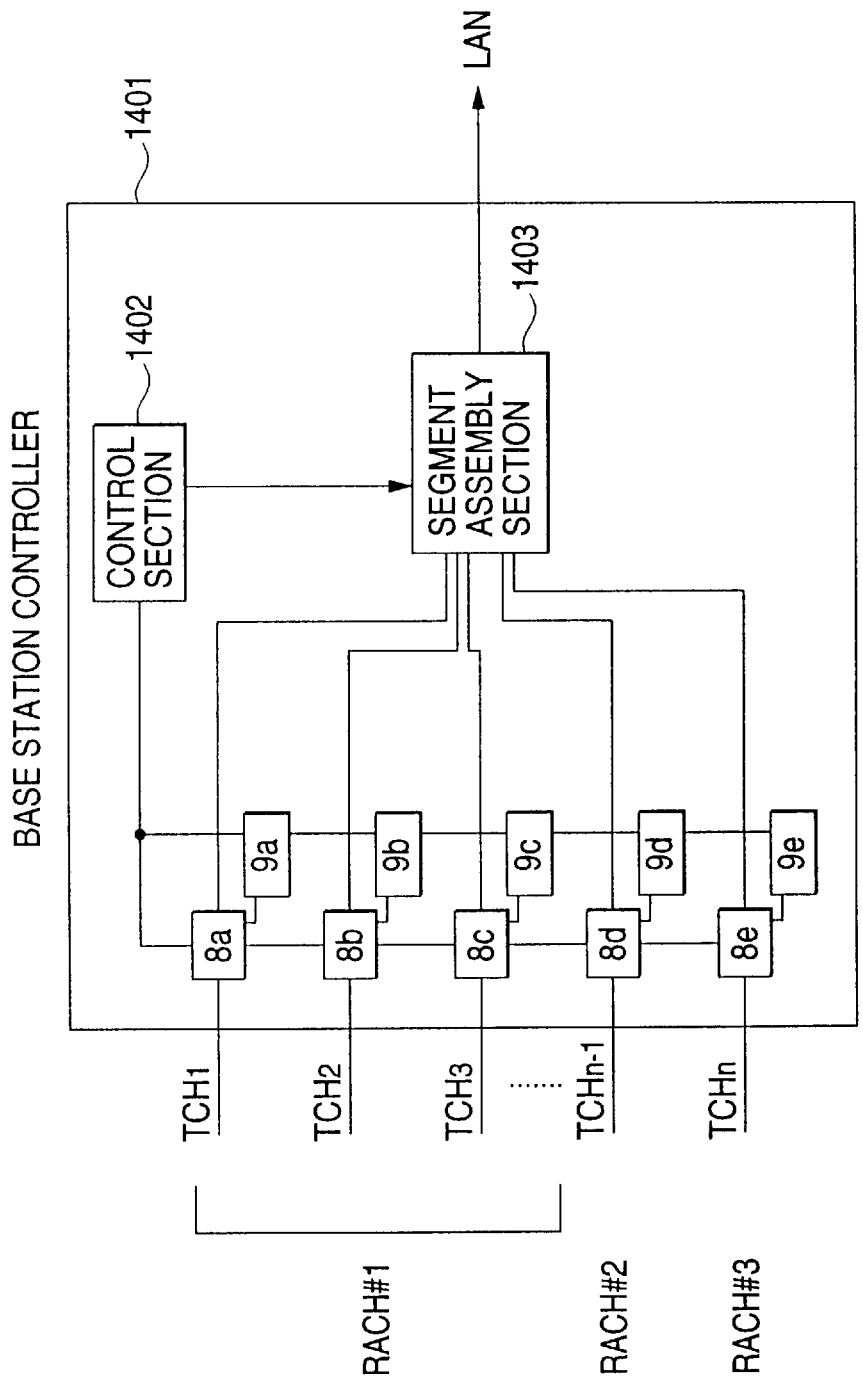
FIG. 30 is a block diagram showing one embodiment of the configuration of the base station controller.

FIG. 29 is a flowchart showing one embodiment of a packet assembling method in the base station controller in the invention. FIG. 30 is a block diagram showing one embodiment of the configuration of the base station controller in the invention.

To transmit data on an integrated RACH, a mobile station transmits segments over a plurality of TCHS. The transmitted segments are sent via a base station to the base station controller on wire lines. Even if the segment order is maintained in the radio lines, it is not always ensured in sending the segments to the wire lines in the base station. That is, the segment order is not always maintained between the base station and the base station controller. Thus, the base station controller needs to reconstruct a packet from the segments sent randomly on the wire lines corresponding to TCHs making up the integrated RACH.

Then, in the embodiment, each mobile station transmits each segment with its order number, and the base station controller 1401 comprises a control section 1402 for managing which TCHs an integrated RACH is made up of, segment storage sections 8a–8e for storing segments sent on TCH, segment order number read sections 9a–9e in a one-to-one correspondence with the segment storage sections 8a–8e, and a segment assembly section 1403. The segment transmitted on each TCH is stored in the segment storage section corresponding to the segment transmission TCH. Each of the segment order number read sections reads the segment from the corresponding segment storage section, extracts the segment number, and passes the segment to the segment assembly section in the segment number order as instructed from the control section. The segment assembly section assembles the segments into a packet.

Alternatively, to ensure the order of segments transmitted from a mobile station between a base station and the base station controller, the base station can also once hold the segments transmitted over TCHS, then place the segments on wire lines on which the segment order is ensured. To use such a transmission system, the control section manages the line numbers of the lines on which the segments are transmitted and the received segments are assembled in order, whereby the segment storage sections and the segment number read sections can also be omitted.

According to the method, since a mobile station transmits segments over an RACH made up of TCHS, the base station or the base station controller can manage the order of segments consecutively transmitted on all the TCHs and assemble the segments into a packet.

Embodiment 15

Figure 31:
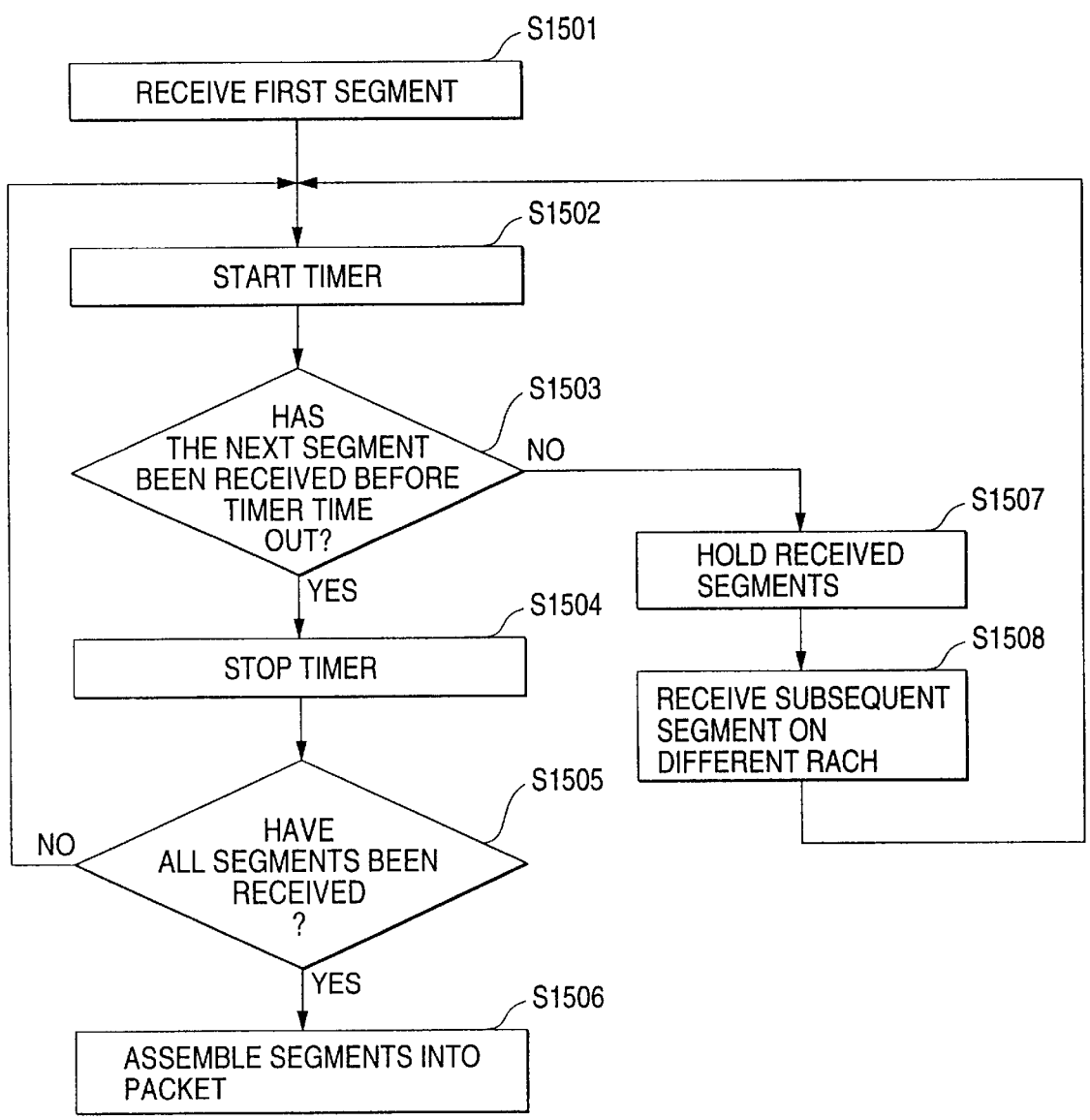
FIG. 31 is a flowchart showing one embodiment of a packet assembling method in the base station controller.

FIG. 31 is a flowchart showing one embodiment of a packet assembling method in the base station controller in the invention. An example wherein a mobile station which is transmitting a packet transmits subsequent segments on a different RACH because of a move across radio zones, a channel shift in a single radio zone, etc., before transmitting all segments of the packet will be discussed.

When receiving the first segment of one packet from a mobile station at step S1501, the base station controller or base station sets a timer waiting for the next segment at step S1502.

If the next segment is received before the timer times out (Yes at step S1503), the timer is stopped at step S1504 and whether or not all segments of the packet have been received is determined at step S1505.

If not all segments are received (No at step S1505), again the timer is set at step S1502. If the mobile station attempts to transmit a subsequent segment over a different RACH and the timer times out (No at step S1503), the base station controller or the base station holds the segments received so far at step S1507.

After this, a wait is made for reception of the subsequent segment on the different RACH and if the subsequent segment is received at step S1508, again the timer is started at step S1502.

After all segments of the packet have been received at step S1505 by repeating the steps, the base station controller or the base station assembles all the segments including the held segments into a packet at step S1506.

According to the method, if a mobile station moves across radio zones, data transmission from the mobile station moving across the radio zones can also be ensured because the base station controller holds a part of the packet transmitted via the move source base station.

Embodiment 16

Figure 32:
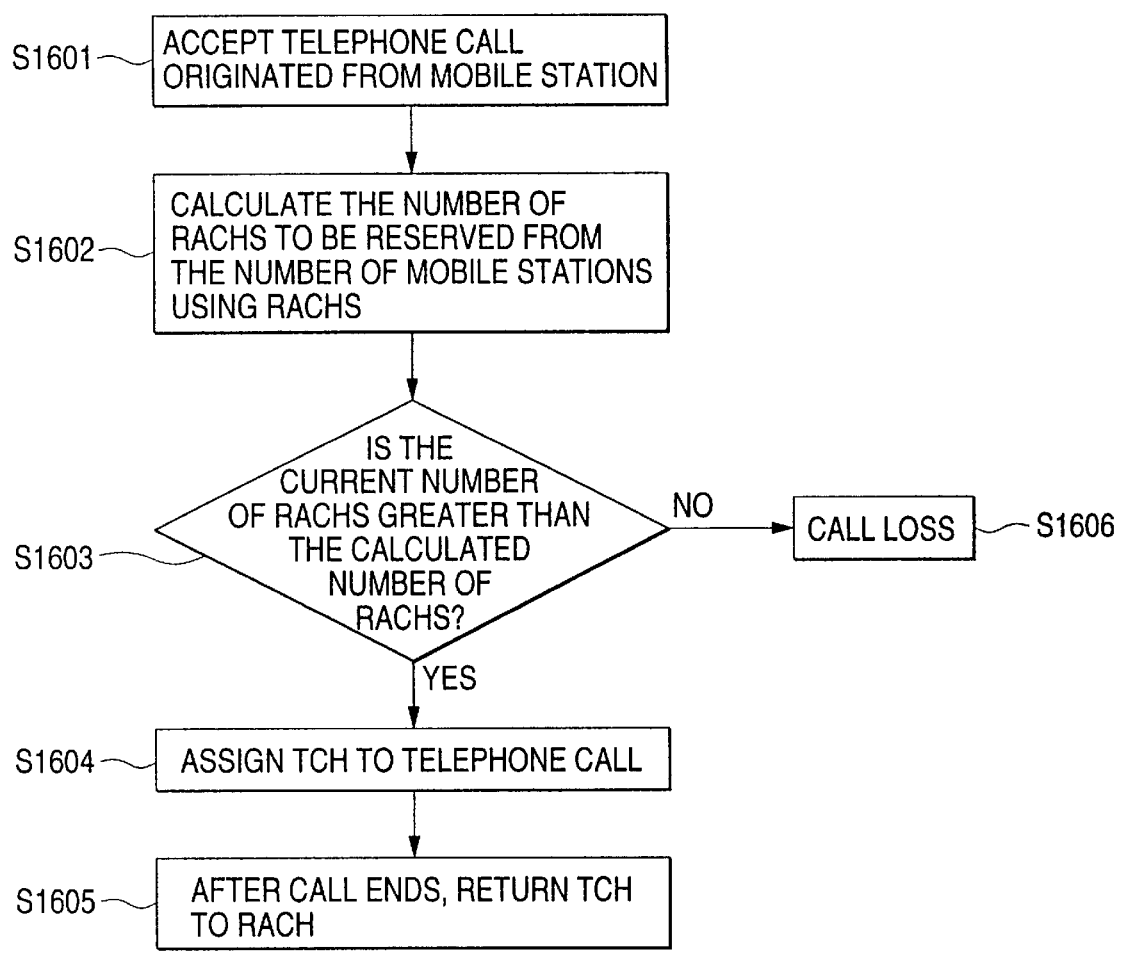
FIG. 32 is a flowchart showing one embodiment of a channel assignment method.

FIG. 32 is a flowchart showing one embodiment of a channel assignment method in the invention.

An example wherein a certain number of RACHs in a radio zone are not used for telephone calls and are reserved for data communication will be discussed. If a given number of RACHs are reserved, for example, in FIG. 5, when a telephone call originated from a mobile station is accepted at step S0101 and whether or not a TCH can be determined at e mobile station is determined at step S0102, whether or not there are RACHs more than the given number is determined. If RACHs exist more than the given number (Yes at step S0102), a TCH is assigned to the originated telephone call at step S0104 and later steps. If RACHs exist as many as the given number (No at step S0102), the originated call is handled as a call loss at step S0103.

To determine the number of RACHs to be reserved in response to the number of mobile stations using RACHS, for example, the operation shown in FIG. 32 is performed. When a telephone call originated from a mobile station is accepted at step S1601, the number of RACHs to be reserved is calculated from the number of mobile stations using RACHs at the time at step S1602. If RACHs exist more than the calculated number of RACHs (Yes at step S1603), a TCH is assigned to the telephone call at step S1604 corresponding to steps S0104 to S0108 in FIG. 5. When the call ends, the TCH is returned to the RACH at step S1605 corresponding to steps S0109 to S0113 in FIG. 5. If RACH remain not more than the number of RACHs calculated at step S1602 (No at step S1603), the telephone call is handled as a call loss at step S1606.

According to the method, channels inhibited from being assigned to telephone calls are provided in the radio zone formed by a base station, whereby RACHs can always be operated in all or some radio zones. Thus, if a mobile station moves across the radio zones or the telephone call traffic is high, data communication can be executed.

Embodiment 17

Figure 33:
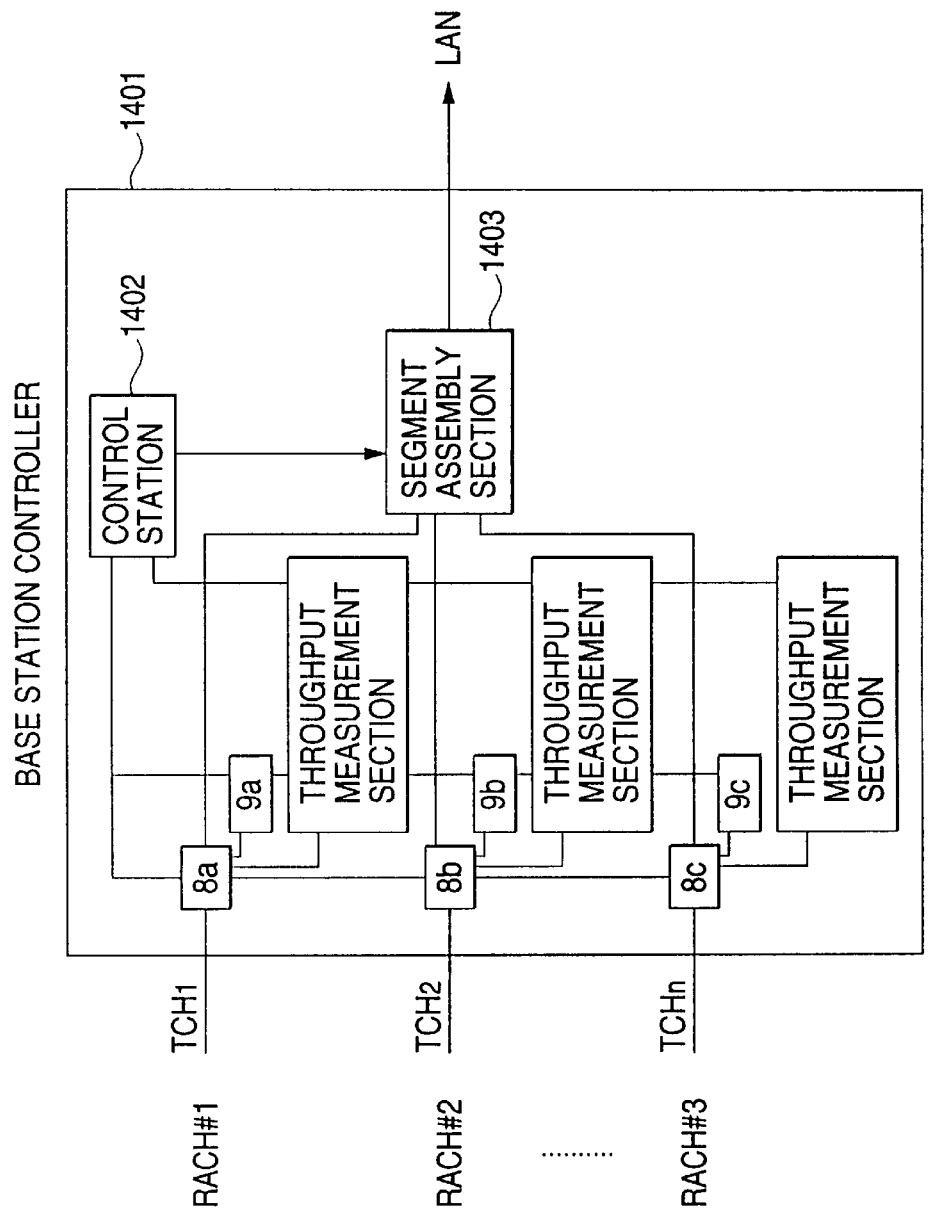
FIG. 33 is a block diagram showing one embodiment of the configuration of the base station controller.
Figure 34:
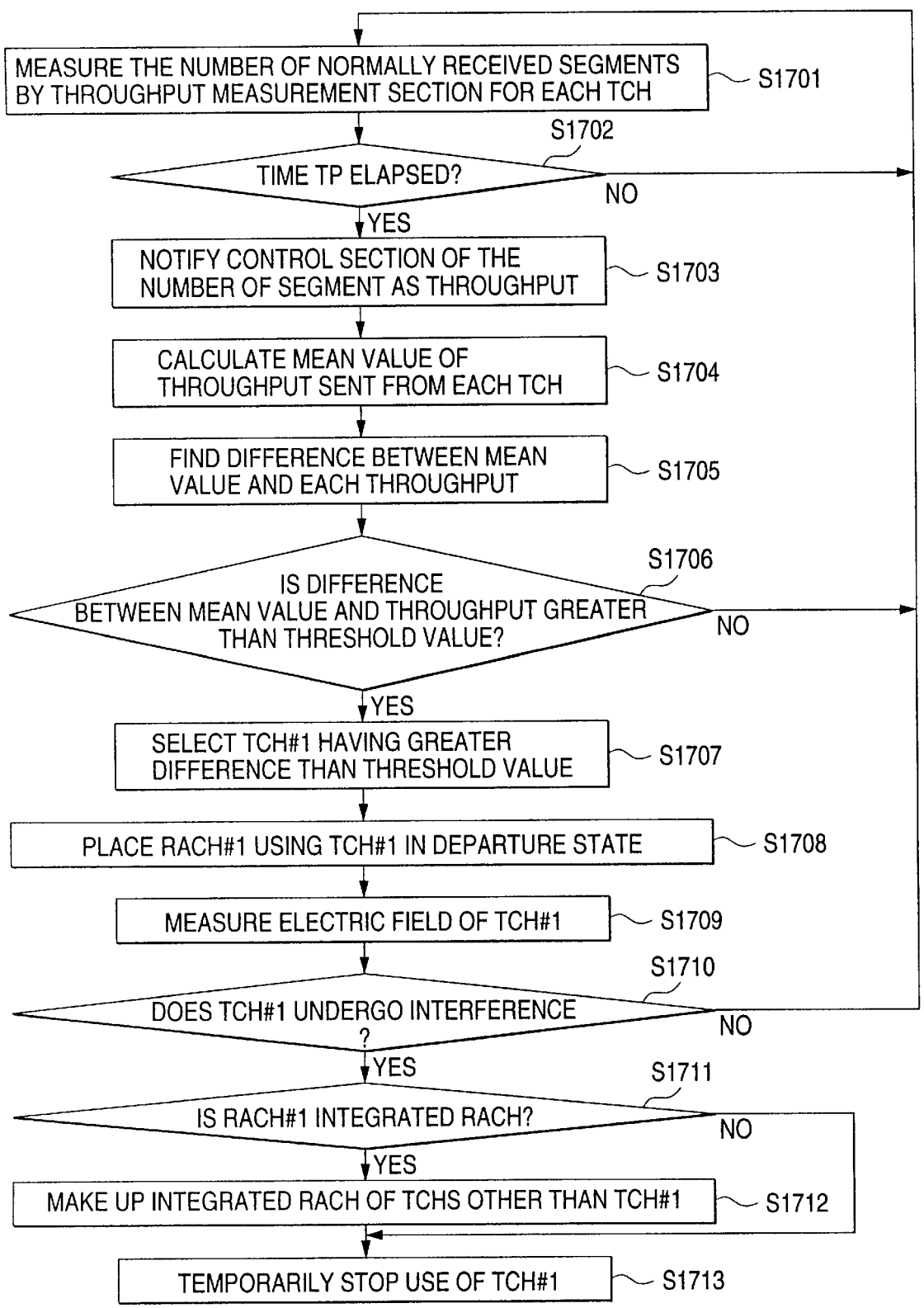
FIG. 34 is a flowchart showing one embodiment of deleting an RACH causing interference.

FIG. 33 is a block diagram showing one embodiment of the configuration of the base station controller in the invention. FIG. 34 is a flowchart showing one embodiment of deleting an RACH causing interference.

In the embodiment, the base station controller 1401 comprises throughput measurement sections for measuring the number of segments sent on each TCH, thereby measuring the throughput of the TCH, a control section 1402 for comparing the throughput of one TCH with that of another, selecting a TCH causing interference, placing the RACH using the TCH in the inhibition state, and stopping use of the TCH, segment storage sections 8a–8e, segment order number read sections 9a–9e, and a segment assembly section 1403.

Each throughput measurement section measures the number of segments arriving at the corresponding segment storage section within predetermined time TP at step S1701 and notifies the control section of the number of segments at step S1703. The control section calculates the mean value of throughput transmitted in TCH units every time TP at step S1704 and finds a difference between the mean value and each throughput at step S1705. If the difference is greater than a threshold value stored in the control section at step S1706, the control section assumes that the TCH having the throughput undergoes interference from another base station at step S1707, places the RACH using the TCH in the inhibition state at step S1708, and measures the electric field of the TCH at step S1709. If the control section judges that the TCH undergoes interference at step S1710, it stops use of the TCH. If the RACH is an integrated RACH at step S1711, the control section makes up the integrated RACH of TCHs other than the TCH undergoing interference at step S1712. If the RACH is not an integrated RACH, the control section stops use of the TCH for the RACH for a given time at step S1713.

According to the method, at each base station, the channel use efficiency of TCHs making up all RACHs managed by the base station is measured, whereby the base station or base station controller only can detect the TCH causing interference. Therefore, the interference channel can be specified without transferring any signal to and from a mobile station and use of the TCH undergoing interference as RACH can be stopped for reducing interference avoidance signals.

Thus, the invention produces the following effects:

All channels unused for telephone calls in a radio communication system centering on telephones can be used as RACHs and a plurality of line switch channels for telephone calls can be used as one RACH to form a high-speed data communication channel and can also be operated each as a random access channel. Thus, the invention has the first effect of enabling data communication with a plurality of mobile stations simultaneously without transferring signals of call setting, etc.

In an RACH, information concerning the RACH and information concerning another RACH are notified. Thus, the invention has the second effect of enabling efficient and rapid RACH contention control and RACH shift in mobile stations.

Since information on RACHs to which a shift can be made is periodically notified at the RACH occupation timing and in the occupied state, the invention has the third effect of enabling mobile stations to shorten the wait time for packet transmission.

Mobile stations make a channel shift at the channel shift timing according to the probability calculated for each mobile station and differ in channel shift timing. Thus, the invention has the fourth effect of reducing the number of mobile stations contending with each other at the same timing on the same RACH and enhancing the channel use efficiency.

Since a TCH used for an RACH is assigned to a telephone call and the mobile station using the RACH can be shifted to another RACH, the invention has the fifth effect of enhancing the channel use efficiency of TCHs managed by the base station.

Since shift destination channels among RACHs operated in a single base station is specified in a cyclic sequence, the invention has the sixth effect of enabling a mobile station to shift to another channel in the cyclic sequence if the mobile station cannot receive on one RACH when making a channel shift.

Since registration of mobile stations managed by the base station or the base station controller is the first RACH at which each mobile station starts a channel shift, the time of acquiring the shift start channel by the mobile station is prolonged, thereby increasing the possibility of success in call incoming and decreasing the probability that mobile stations may make a channel shift at the same time. Thus, the invention has the seventh effect of also decreasing the probability that the mobile station may send segments at the same timing on the shift destination RACH and decreasing the segment collision probability.

Since registration of mobile stations managed by the base station or the base station controller is the first RACH at which each mobile station starts a channel shift, the time of acquiring the shift start channel by the mobile station is prolonged, thereby increasing the possibility of success in call incoming and decreasing unnecessary channel shift of the mobile stations. This is the eighth effect of the invention.

When mobile stations use RACHS, the RACH specified from the corresponding base station varies from one mobile station to another, the invention has the ninth effect of distributing the mobile stations aquiring the same RACH, decreasing the number of mobile stations contending with each other, and shortening the wait time for sending a packet.

Since the segment containing synchronization bits is used for contention control, each mobile station need not establish up synchronization at the RACH assignment time or the shift time. Since each mobile station can acquire the RACH use right in units of packets that can be sent to the LAN, the invention has the tenth effect of enabling the base station controller to assemble segments sent from a mobile station into a packet that can be sent to the LAN.

Since the base station controller converts and manages terminal identifiers used with the LAN and those used with the radio communication system, processing can be performed on the LAN without being concerned with a move of mobile stations. Since RACHs acquired by mobile stations are managed with the channel numbers CN of TCHS, an incoming packet can be transmitted on the TCH having the corresponding CN. This is the eleventh effect of the invention.

Since move management is executed without position registration from mobile stations, the invention has the twelfth effect of reducing position registration traffic and facilitating transmission of an incoming packet to the mobile station for which the packet is destined.

Since a plurality of TCHs are handled as one RACH, a high-speed RACH can be formed. Since a high-speed RACH is made up of predetermined TCHS, processing of segments transmitted from the high-speed RACH can be simplified in the base stations and the base station controller. This is the thirteenth effect of the invention.

A plurality of high-speed RACHs can be formed in one base station, one high-speed RACH can be divided into a plurality of RACHS, and the transmission speed of the RACH can be varied depending on the performance of each mobile station and telephone call traffic. Thus, the invention has the fourteenth effect of providing flexible high-speed data communication channels less affecting telephone calls.

Since each mobile station transmits segments over RACH made up of TCHS, the base station and the base station controller can manage the order of the segments transmitted consecutively over all the TCHs and assemble the segments into a packet. This is the fifteenth effect of the invention.

If a mobile station moves across radio zones, data transmission from the mobile station moving across the radio zones can also be ensured because the base station controller holds a part of the packet transmitted via the move source base station. This is the sixteenth effect of the invention.

RACHs can always be operated by providing channels inhibited from being assigned to telephone calls in all or some of radio zones. Thus, when a mobile station moves across the radio zones or the telephone call traffic is high, data communication can also be executed. This is the seventeenth effect of the invention.

Since a TCH causing interference can be detected by measuring the channel use efficiency in each base station, the invention has the eighteenth effect of being capable of specifying the interference channel without transfering any signal to and from a mobile station.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A radio data transmission system, comprising:
   a plurality of base stations;
   a plurality of mobile stations; and
   a base station controller;
   wherein radio channels between each base station and a plurality of mobile stations consist of a control channel (CCH) and a plurality of communication channels (TCHs); and
   wherein each base station comprises means for notifying channels that can be used as data communication channels using a random access method (RACHS) among the TCHs over the CCH, means for transmitting channel information concerning each RACH over each RACH, and means for notifying another RACH to which a shift can be made.

2. A radio data transmission system, comprising:
   a plurality of base stations;
   a plurality of mobile stations; and
   a base station controller;
   wherein radio channels between each base station and a plurality of mobile stations includes a control channel (CCH) and a plurality of communication channels (TCHs);
   wherein each base station comprises means for transmitting channel information concerning each RACH over each RACH;
   wherein a base station using a plurality of TCHs as data communication channels using a random access method (RACHS) transmits a packet transmission disable notification and a shift destination RACH notification on one of the RACHs by said channel information notifying means; and
   wherein said mobile station receiving the notification on the RACH shifts from the RACH to another RACH specified in the shift destination RACH notification with the notification reception as a trigger.

3. A radio data communication system as claimed in claim 2, wherein each mobile station comprises means for calculating RACH shifting probability Pa, means for comparing the probability Pa with a threshold value stored in said mobile station, means for executing RACH shifting if the probability is greater than the threshold value, and means for postponing RACH shifting for time T1 if the probability is less than the threshold value.

4. A radio data transmission system, comprising:
   a plurality of base stations;
   a plurality of mobile stations;
   a base station controller, in which radio channels between each base station and a plurality of mobile stations consist of a control channel (CCH) and a plurality of communication channels (TCHS) wherein each of said base stations uses a plurality of TCHs as data communication channels using a random access method (RACHs);
   means for deleting the RACH assigned to a telephone call from a managed RACH group when one of said base stations using a plurality of TCHs as RACHs and said base station controller for controlling said base station require a TCH as a new telephone call occurs;
   means for transmitting channel information concerning each RACH over each RACH;
   means for sending a departure instruction notification of the RACH from said base station to mobile stations acquiring the RACH through said notification mean and sending a message to the effect that the RACH becomes unavailable as an RACH on all other RACHs managed by said base station through said notification means; and
   means for changing registration of the mobile stations registered in the RACH to a shift destination RACH specified on the RACH by said base station controller.

5. A radio data transmission system, comprising:
   determination means for cyclically determining data communication channels using a random access method (RACHS) managed by one base station to which mobile stations can shift among the RACHs managed by said base station;
   means for transmitting channel information concerning each RACH over each RACH;
   notification means for notifying mobile stations of a cyclic RACH sequence determined by said determination means through said notification means by said base station; and
   means for shifting channels in sequence in response to the notification.

6. A radio data communication system, comprising:
   means for calculating probability Pb of continuing RACH shift for each mobile station when a mobile station having a send packet makes an RACH shift in sequence according to shift destination RACHs notified from a base station if an RACH acquired by the mobile station is used for packet transmission of another mobile station, and all RACHs are used for other mobile stations at a stage where all RACHs managed by the base station have been cycled in RACH shift based on cyclic RACH specification;
   comparison means for comparing the calculated probability Pb with a threshold value stored in the mobile station; and means being responsive to the comparison result of said comparison means for again starting RACH shifting based on the cyclic RACH specification if the probability Pb is greater than the threshold value and for postponing RACH shifting for time T if the probability Pb is less than the threshold value.

7. A radio data communication system having a plurality of mobile stations, each of said mobile stations comprising:

means for storing the number of times a shift channel cyclic sequence has been cycled in RACH shift based on cyclic RACH specification;

means being responsive to the number of times it has been cycled for calculating cyclic probability Pc at a stage where the mobile station shifts on the shift channel cyclic sequence based on shift channel information notified from a base station and has shifted all RACHs managed by the base station;

means for comparing the calculated probability Pc with a threshold value previously stored in the mobile station and judging continuation or postponement of the shifting; and means for changing postponement time T in response to the number of times if postponement is judged.

8. A radio data transmission system, comprising:

a plurality of base stations;

a plurality of mobile stations; and a base station controller, in which radio channels between each base station and a plurality of mobile stations consist of a control channel (CCH) and a plurality of communication channels (TCHS) wherein each of said base stations uses a plurality of TCHs as data communication channels using a random access method (RACHs);

wherein each base station comprises means for managing a plurality of RACHs and that said base station controller comprises means, when one of said mobile stations requests use of a new RACH over a CCH, for specifying a RACH to be used for said mobile station and means for assigning different RACHs in sequence to mobile stations making use requests in sequence.

9. A radio data transmission system, comprising:

a plurality of base stations;

a plurality of mobile stations; and a base station controller in which radio channels between each base station and a plurality of mobile stations consist of a control channel (CCH) and a plurality of communication channels (TCHS) and down channels of the TCHs include an attendant CCH using a time division multiple access (TDMA) as a radio access between said base stations and said mobile stations;

wherein each of said mobile stations comprises means for generating a packet in a format that can be sent to a local area network (LAN), means for dividing the packet into segments, and means for adding a synchronization bit and a number identifying the mobile station to a first segment for generating segments, that each of said base stations comprises means, when one of said mobile stations sends the first segment to a transmittable RACH and said base station normally receives the segment, for notifying the mobile station number of said mobile station and information indicating that the mobile stations other than said mobile station are disabled from transmitting on the RACH on the down attendant CCH of the RACH, thereby notifying said mobile station of use right of the RACH and inhibiting other mobile stations acquiring the RACH from transmitting a packet and means for establishing up synchronization by using the first segment, that each of said mobile stations comprises means for adding numbers for identifying the segments, and that said base station controller or each of said base stations comprises means for releasing the use right of the RACH upon reception of the last segment according to the segment identification numbers.

10. A radio data transmission system, comprising:

a plurality of base stations;

a plurality of mobile stations; and a base station controller connected to a local area network (LAN) and having a channel configuration in which radio channels between each base station and a plurality of mobile stations consist of a control channel (CCH) and a plurality of communication channels (TCHS) wherein each of said base stations uses a plurality of TCHs as data communication channels using a random access method (RACHs);

wherein said base station controller comprises means for assembling segments sent from one of said mobile stations into a packet in a format that can be sent to the LAN, means for sending the packet to the LAN, a conversion table for representing correspondence among mobile station numbers TNs identifying said mobile stations, addresses TAs identifying said mobile stations in the LAN, and channel numbers CNs identifying RACHS, means for searching said conversion table upon reception of an RACH use request from one of said mobile stations, means, if the TN of said mobile station does not exist in said conversion table, for registering the TN and the CN of an RACH specified by the channel assignment system as claimed in claim 9 in said conversion table, means, if the TN of said mobile station is registered, for changing the CN corresponding to the registered TN to the CN of RACH specified by the channel assignment system, and means for changing said conversion table if upon reception of a packet over RACH from the mobile station identified by TN, the CN of the RACH differs from the CN stored in said conversion table.

11. A radio data transmission system, comprising:

a plurality of base stations;

a plurality of mobile stations; and a base station controller connected to a local area network (LAN) and having a channel configuration wherein radio channels between each base station and a plurality of mobile stations consist of a control channel (CCH) and a plurality of communication channels (TCHS) wherein each of said base stations uses a plurality of TCHs as data communication channels using a random access method (RACHs);

wherein said base station controller comprises means, upon reception of a packet destined for one of said mobile stations from the LAN, for searching the conversion table for channel number TN of an RACH acquired by said mobile station and sending a call incoming notification with the TN of the packet destined for said mobile station to said base station managing the RACH, that said base station comprises means for passing on the packet incoming notification over down CCHs corresponding to all RACHs managed by said base station when receiving the packet incoming notification from said base station controller, that said mobile station comprises means, if said mobile station is shifting from one RACH to another for sending a packet, for stopping the channel shifting and returning to the channel shifting start RACH upon reception of the call incoming notification, that said base station controller comprises means for transmitting the packet to the RACH corresponding to the mobile station number of said mobile station stored in the conversion table in time Tp after sending the packet incoming notification, and that said base station comprises means for passing on the packet received from said base station controller on a radio channel.

12. A radio data transmission system, comprising:

a plurality of base stations;

a plurality of mobile stations;

a base station controller, wherein radio channels between each base station and a plurality of mobile stations consist of a control channel (CCH) and a plurality of communication channels (TCHs);

means for handling two or more of TCHs managed by one base station fixedly as one integrated RACH, means, when a telephone call occurs, for assigning one TCH in the integrated RACH to the telephone call; and means for integrating the remaining TCHs determined to be the integrated RACH other than the TCH assigned to the telephone call and handling them as one RACH, wherein said base station and said base station controller comprise means for combining the TCH released from the telephone call upon the end of the call and the RACH into one RACH for operation.

13. A radio data transmission system, comprising:

a plurality of base stations;

a plurality of mobile stations; and a base station controller wherein a channel configuration wherein radio channels between each base station and a plurality of mobile stations consist of a control channel (CCH) and a plurality of communication channels (TCHS) wherein each of said base stations uses a plurality of TCHs as data communication channels using a random access method (RACHs);

wherein, when said base station uses two or more TCHs for RACH, said base station and said base station controller comprise means for assembling some of the TCHs into one RACH, means for dividing the RACH into a plurality of RACHs for operation, and means for operating a plurality of RACHs different in speed.

14. A radio data transmission system, comprising:

identification means for identifying the order of segments transmitted consecutively on a plurality of communication channels making up integrated communication channels using random access from one mobile station and means for assembling the segments ordered by said identification means into a packet that can be transmitted to a local area network (LAN).

15. A radio data transmission system, comprising:

a plurality of base stations;

a plurality of mobile stations;

a base station controller, wherein radio channels between each base station and a plurality of mobile stations consist of a control channel (CCH) and a plurality of communication channels (TCHS) wherein all or some of said base stations use one or more TCHs as data communication channel using a random access method (RACHS);

means, if said base station or said base station controller does not receive a segment from a mobile station having use right of RACH during time TT, for assuming that packet transmission on the RACH has abnormally ended and releasing the RACH;

means for holding segments received so far from the mobile station, means for storing segments that cannot be transmitted on the RACH by the mobile station;

means, when the mobile station newly gets use right of RACH, for again transmitting on the RACH the segments that cannot be transmitted; and means for assembling the segments held by one of said base station and said base station controller and newly received segments into a packet.

16. A radio data transmission system, comprising a plurality of base stations;

a plurality of mobile stations;

a base station controller, wherein radio channels between each base station and a plurality of mobile stations consist of a control channel (CCH) and a plurality of communication channels (TCHS) wherein each of said base stations uses a plurality of TCHs as data communication channels using a random access method (RACHs);

means for inhibiting the TCHs used as the RACHs from being used as VCHs used for telephone calls; and means for determining the number of channels of the TCHs inhibited from being assigned to the VCHs in response to the number of mobile stations using the RACHS.

17. A radio data transmission system, comprising:

a plurality of base stations;

a plurality of mobile stations;

a base station controller, in which radio channels between each base station and a plurality of mobile stations include a control channel (CCH) and a plurality of communication channels (TCHS) wherein each of said base stations uses a plurality of TCHs as data communication channels using a random access method (RACHs);

means for measuring line use efficiency of each RACH managed by one base station;

means for comparing the measured line use efficiency of one RACH with that of another RACH;

means for selecting an RACH having lower line use efficiency than other RACHs based on the comparison result; and means for deleting the selected RACH from the RACH group, inhibiting use of the RACH, and deleting the RACH from shift destination RACHS.

* * * * *